(12) United States Patent
Smits et al.

(10) Patent No.: US 12,276,730 B2
(45) Date of Patent: Apr. 15, 2025

(54) VIRTUAL FENCES IN AIR, WATER, AND SPACE

(71) Applicant: Summer Robotics, Inc., Campbell, CA (US)

(72) Inventors: Gerard Dirk Smits, Los Gatos, CA (US); Steven Dean Gottke, Concord, CA (US)

(73) Assignee: Summer Robotics, Inc., Campbell, CA (US)

( * ) Notice: Subject to any disclaimer, the term of this patent is extended or adjusted under 35 U.S.C. 154(b) by 0 days.

(21) Appl. No.: 18/504,052

(22) Filed: Nov. 7, 2023

(65) Prior Publication Data
US 2024/0329248 A1 Oct. 3, 2024

Related U.S. Application Data

(60) Provisional application No. 63/382,872, filed on Nov. 8, 2022.

(51) Int. Cl.
*G01F 3/36* (2006.01)
*G01S 7/48* (2006.01)
(Continued)

(52) U.S. Cl.
CPC ............ *G01S 17/58* (2013.01); *G01S 7/4808* (2013.01); *G01S 7/484* (2013.01); *G01S 17/89* (2013.01); *G06V 20/44* (2022.01)

(58) Field of Classification Search
CPC ........ G01S 17/58; G01S 17/89; G01S 7/4808; G01S 7/484; G06V 20/44
See application file for complete search history.

(56) References Cited

U.S. PATENT DOCUMENTS

| 9,117,267 B2 | 8/2015 | Francis, Jr. et al. |
| 9,489,735 B1 | 11/2016 | Reitmayr |

(Continued)

FOREIGN PATENT DOCUMENTS

| CN | 109458928 A | 3/2019 |
| CN | 112365585 A | 2/2021 |

(Continued)

OTHER PUBLICATIONS

International Search Report and Written Opinion for International Patent Application No. PCT/US2021/063399 mailed Mar. 22, 2022, 6 Pages.

(Continued)

*Primary Examiner* — Mark Hellner
(74) *Attorney, Agent, or Firm* — John W. Branch; Branch Partners PLLC

(57) ABSTRACT

Embodiments are directed to perceiving scene features using event sensors and image sensors. Enclosures mounted may be on structures arranged to establish a boundary where each enclosure includes an event camera, a beam generator, or a frame camera. The beam generators may be employed to scan paths across objects in a scene that may be outside the boundary. Events may be determined based on detection of beam reflections corresponding to the objects. Trajectories associated with the objects may be determined based on the paths and the events. Objects that may be authorized may be determined based on trajectories associated with authorized objects. Objects in the scene that may be unauthorized may be determined based on trajectories associated with the unauthorized objects. A representation of the unauthorized objects may be determined such that a position and an orientation of the unauthorized objects in the scene may be based on the trajectories.

30 Claims, 15 Drawing Sheets

(51) Int. Cl.
*G01S 7/484* (2006.01)
*G01S 17/58* (2006.01)
*G01S 17/89* (2020.01)
*G06V 20/40* (2022.01)

(56) References Cited

U.S. PATENT DOCUMENTS

| | | | |
|---|---|---|---|
| 11,704,835 | B2 | 7/2023 | Cullen et al. |
| 11,785,200 | B1 | 10/2023 | Smits et al. |
| 11,808,857 | B2 | 11/2023 | Cullen et al. |
| 2008/0012850 | A1 | 1/2008 | Keating, III |
| 2008/0165360 | A1 | 7/2008 | Johnston |
| 2008/0201101 | A1 | 8/2008 | Hebert et al. |
| 2009/0096994 | A1 | 4/2009 | Smits |
| 2014/0368614 | A1 | 12/2014 | Imai et al. |
| 2015/0378023 | A1 | 12/2015 | Royo Royo et al. |
| 2016/0180574 | A1 | 6/2016 | Kaminitz et al. |
| 2016/0259168 | A1 | 9/2016 | Katz et al. |
| 2017/0035281 | A1 | 2/2017 | Takeuchi et al. |
| 2017/0176575 | A1 | 6/2017 | Smits |
| 2017/0195589 | A1 | 7/2017 | Kovacovsky et al. |
| 2018/0180733 | A1* | 6/2018 | Smits .............. G06T 7/521 |
| 2019/0128665 | A1 | 5/2019 | Harendt |
| 2019/0213309 | A1 | 7/2019 | Morestin et al. |
| 2019/0279379 | A1 | 9/2019 | Srinivasan et al. |
| 2020/0075658 | A1 | 3/2020 | Kato et al. |
| 2020/0160012 | A1 | 5/2020 | Nunnink et al. |
| 2020/0280664 | A1 | 9/2020 | Lee et al. |
| 2021/0023714 | A1 | 1/2021 | Zhang et al. |
| 2021/0141094 | A1 | 5/2021 | Russ et al. |
| 2021/0304574 | A1* | 9/2021 | Ramanathan .......... H04N 7/181 |
| 2022/0156998 | A1 | 5/2022 | Lee et al. |
| 2022/0187461 | A1 | 6/2022 | Cullen |
| 2022/0287676 | A1 | 9/2022 | Steines et al. |
| 2023/0003549 | A1 | 1/2023 | Paden |
| 2023/0015889 | A1 | 1/2023 | Cullen et al. |
| 2023/0034733 | A1 | 2/2023 | Cullen et al. |
| 2023/0060421 | A1 | 3/2023 | Cullen et al. |
| 2023/0169683 | A1 | 6/2023 | Paden et al. |
| 2023/0230212 | A1 | 7/2023 | García et al. |
| 2023/0274523 | A1 | 8/2023 | Paden et al. |
| 2023/0316657 | A1 | 10/2023 | Smits et al. |
| 2023/0360268 | A1 | 11/2023 | Cullen et al. |

FOREIGN PATENT DOCUMENTS

| | | | |
|---|---|---|---|
| CN | 112750168 A | | 5/2021 |
| CN | 113313710 A | | 8/2021 |
| CN | 116829902 A | | 9/2023 |
| EP | 4260006 A1 | | 6/2022 |
| JP | H06-94428 A | | 4/1994 |
| JP | 2009-243986 A | | 10/2009 |
| JP | 2018-195240 A | | 12/2018 |
| JP | 2020-52719 A | | 4/2020 |
| JP | 2020-64011 A | | 4/2020 |
| JP | 2020106475 A * | 7/2020 | ............ G01S 7/497 |
| JP | 2021-167776 A | | 10/2021 |
| KR | 20210075563 A * | 6/2021 | ....... G08B 13/19602 |
| WO | 2018/000037 A1 | | 1/2018 |
| WO | 2018/125850 A1 | | 7/2018 |
| WO | 2019/189381 A1 | | 10/2019 |
| WO | 2020/080237 A1 | | 4/2020 |
| WO | 2021/039022 A1 | | 3/2021 |
| WO | 2021/140886 A1 | | 7/2021 |
| WO | 2022/132828 A1 | | 6/2022 |
| WO | 2023/278868 A1 | | 1/2023 |
| WO | 2023/288067 A1 | | 1/2023 |
| WO | 2023/009755 A1 | | 2/2023 |
| WO | 2023/028226 A1 | | 3/2023 |
| WO | 2023/096873 A1 | | 6/2023 |
| WO | 2023/164064 A1 | | 8/2023 |
| WO | 2023/177692 A1 | | 9/2023 |
| WO | 2023/196225 A1 | | 10/2023 |

OTHER PUBLICATIONS

International Search Report and Written Opinion for International Patent Application No. PCT/US2022/036006 mailed Oct. 4, 2022, 7 Pages.
International Search Report and Written Opinion for International Patent Application No. PCT/US2022/037299 mailed Oct. 25, 2022, 6 Pages.
International Search Report and Written Opinion for International Patent Application No. PCT/US2022/038724 mailed Nov. 1, 2022, 6 Pages.
International Search Report and Written Opinion for International Patent Application No. PCT/US2022/041520 mailed Nov. 8, 2022, 6 Pages.
Office Communication for U.S. Appl. No. 17/876,333 mailed Feb. 21, 2023, 22 Pages.
Office Communication for U.S. Appl. No. 17/876,333 mailed Mar. 1, 2023, 2 Pages.
International Search Report and Written Opinion for International Patent Application No. PCT/US2022/050626 mailed Mar. 7, 2023, 8 Pages.
Office Communication for U.S. Appl. No. 17/895,489 mailed Apr. 11, 2023, 36 Pages.
International Search Report and Written Opinion for International Patent Application No. PCT/US2023/013718 mailed May 30, 2023, 7 Pages.
Office Communication for U.S. Appl. No. 18/130,080 mailed Jun. 20, 2023, 36 Pages.
Office Communication for U.S. Appl. No. 17/895,489 mailed Jul. 5, 2023, 13 Pages.
International Search Report and Written Opinion for International Patent Application No. PCT/US2023/015227 mailed Jun. 27, 2023, 7 Pages.
International Preliminary Report on Patentability for International Patent Application No. PCT/US2021/063399 mailed Jun. 29, 2023, 5 Pages.
International Search Report and Written Opinion for International Patent Application No. PCT/US2023/017271 mailed Jul. 11, 2023, 7 Pages.
Office Communication for U.S. Appl. No. 18/121,486 mailed Aug. 16, 2023, 2 Pages.
Office Communication for U.S. Appl. No. 18/121,486 mailed Aug. 3, 2023, 11 Pages.
Office Communication for U.S. Appl. No. 18/222,780 mailed Sep. 15, 2023, 10 Pages.
Office Communication for U.S. Appl. No. 18/130,080 mailed Sep. 28, 2023, 43 Pages.
Office Communication for U.S. Appl. No. 18/225,833 mailed Sep. 15, 2023, 19 Pages.

* cited by examiner

VIRTUAL FENCES IN AIR, WATER, AND SPACE

CROSS-REFERENCE TO RELATED APPLICATION

This application is a Utility Patent application based on previously filed U.S. Provisional Patent Application U.S. Ser. No. 63/382,872 filed on Nov. 8, 2022, the benefit of the filing date of which is hereby claimed under 35 U.S.C. § 119(e), and the contents of which is further incorporated in entirety by reference.

TECHNICAL FIELD

The present innovations relate generally to machine sensing or machine vision systems, and more particularly, but not exclusively, to virtual fences in air, water, and space.

BACKGROUND

Virtual fences at borders or surrounding area perimeters have been used for surveillance in places where an actual fence is either impractical or insufficient. One common implementation of this is having multiple video frame cameras with overlapping fields of view. Such systems formerly were designed for human supervision, but increasingly automated systems are monitoring video feeds and combining data from them. However, these systems have high requirements for computation and data throughput, particularly at the edge of networks where these systems are often employed. In addition, these systems may be highly affected by environmental changes, such as day/night lighting, weather conditions, and others that could significantly increase their cost and complexity. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1A:
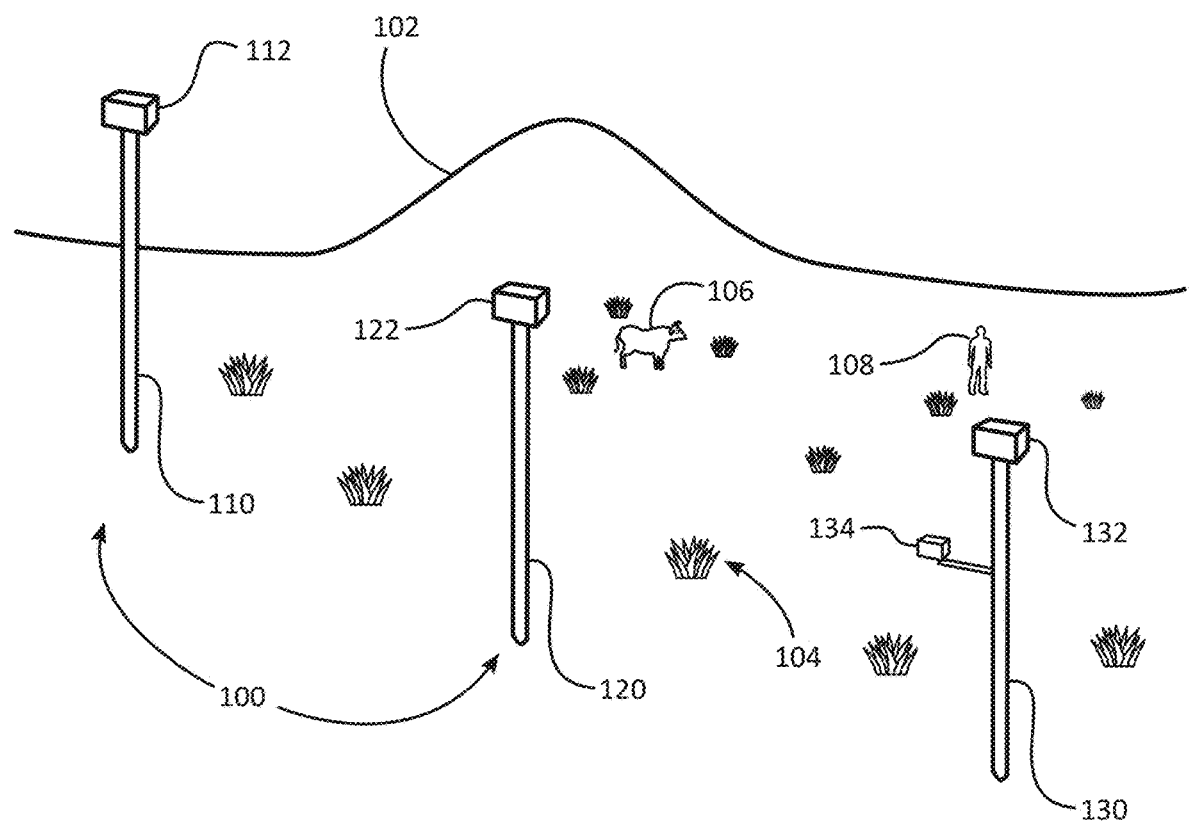
FIG. 1A shows a perspective view of a scene and a virtual fence in accordance with one or more of the various embodiments.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the present innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," "signal generator," or "beam scanner" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan various frequencies, including up to 10 s of kHz. The scanning signal generators may be controlled in a closed loop fashion with one or more processors that may provide feedback about objects in the environment and instructs the scanning signal generator to modify its amplitudes, frequencies, phase, or the like.

As used herein, the terms "event sensor," "event camera sensor," or "event camera" refer to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate sensor outputs (events) that report the triggered cell location and time of detection for individual cells rather than being limited to reporting the state or status of every cell. For example, event sensors may include event sensor cameras, SPAD arrays, SiPM arrays, or the like.

As used herein the terms "image sensor," or "frame camera" refer to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras. Also, in some cases, image sensors may be deployed or otherwise used to collect event information.

As used herein the terms "trajectory," "parametric trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein, the term "virtual fence" includes one or more elements of a surveillance system, which may include a 3-D perception subsystem and may optionally include other surveillance components. The virtual fence might include portions such as an actual fence or wall designed to prevent or discourage crossing of a particular border, but in many cases will have little or no physical blocking portions. A border may be construed as the boundary between one territory and another. The territories may be adjacent (e.g., a border between two countries), or one territory may be included inside of another (e.g., the border may be a perimeter fence around a land area).

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the innovations in order to provide a basic understanding of some aspects of the innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to perceiving scene features using event sensors and image sensors. In one or more of the various embodiments, one or more enclosures mounted on one or more structures that are physically arranged may be employed to establish a boundary such that each enclosure includes one or more of an event camera, a beam generator, or a frame camera. In one or more of the various embodiments, the one or more beam generators may be employed to scan a plurality of paths across one or more objects in a scene that may be observable outside the boundary. In one or more of the various embodiments, a plurality of events may be determined based on detection of one or more beam reflections corresponding to the one or more objects. In some embodiments, a plurality of trajectories associated with the one or more objects may be determined based on the plurality of paths and the plurality of events such that each trajectory may be a parametric representation of a one-dimensional curve segment in a three-dimensional space. In some embodiments, the one or more objects that may be authorized may be determined based on a portion of the plurality of trajectories associated with the one or more authorized objects. In some embodiments, the one or more objects in the scene that may be unauthorized may be determined based on another portion of the plurality of trajectories associated with the one or more unauthorized objects. In some embodiments, a three-dimensional scene that includes a representation of the one or more unauthorized objects may be determined such that a position and an orientation of the one or more represented unauthorized objects in the scene may be based on the plurality of trajectories.

In one or more of the various embodiments, scanning the plurality of paths across one or more objects may include: adjusting a power of the one or more beam generators based on a predicted distance to a portion of the one or more unauthorized objects such that increasing the power of the one or more beam generators enables the one or more beam generators to generate one or more trajectories for the portion of one or more the unauthorized objects that may be at the predicted distance.

In one or more of the various embodiments, one or more persons in the scene may be determined based on the plurality of trajectories. In some embodiments, a power level of the one or more beam generators may be adjusted based on a distance from the one or more beam generators to the one or more persons such that decreasing the power of the one or more beam generators reduces a probability of causing injury to the one or more persons.

In one or more of the various embodiments, a power level or a wavelength of the one or more beam generators may be adjusted based on a predicted distance from the one or more beam generators to a portion of the one or more unauthorized objects such that increasing the power of the one or more beam generators enables the one or more beam generators to generate one or more trajectories for a portion of one or more the unauthorized objects that are at the predicted distance.

In one or more of the various embodiments, an angle of the one or more beam generators may be oscillated in a vertical plane based on a height of the mounting of the one or more enclosures such that increasing the angle with respect to a horizon decreases a range of one or more beams from the one or more beam generators and such that decreasing the angle with respect to the horizon increases the range of the one or more beams.

In one or more of the various embodiments, an angle of the one or more beam generators in a vertical plane may be oscillated based on a height of the mounting of the one or more enclosures such that a power level of the one or more beam generators may be increased as the angle increases a distance of travel for the one or more beams to reach the one or more objects.

In one or more of the various embodiments, the one or more enclosures may include: one or more of another event camera: another beam generator; or another frame camera; such that the other event camera, the other beam generator, or the other frame camera in the one or more enclosures may be pointed towards a portion of the scene that is observable inside the boundary.

In one or more of the various embodiments, the one or more enclosures may include arranging the one or more structures along the boundary such that each enclosure may be enabled to communicate to at least one other enclosure one or more of an event, a trajectory, object information, or scene information.

In one or more of the various embodiments, the one or more enclosures may include arranging the one or more structures in a mesh configuration such that each enclosure may be enabled to communicate to at least one other enclosure one or more of an event, a trajectory, object information, or scene information.

In one or more of the various embodiments, the one or more enclosures nay include: positioning the one or more structures in an underwater environment; determining a wavelength of the one or more beam generators based on a transmissibility of the one or more reflected beams through the underwater environment; adjusting a power level or a wavelength of the one or more beam generators based on a turbidity of the underwater environment such that the adjustment of the power or adjustment of the wavelength increases a distance of travel to the one or more objects for the one or more beams; or the like.

In one or more of the various embodiments, the one or more enclosures may include: positioning the one or more structures in one or more satellites in an orbital environment above the earth; determining a portion of one or more objects that may be moving towards the one or more structures based on one or more of an event or a trajectory; or the like.

DETAILED DESCRIPTION

In some cases, scanning triangulation systems may be effective at 3-D perception of environments at near range. Under some circumstances, the range at which they may be used may be increased allowing use for surveillance systems on virtual fences at range. FIG. 1A shows a scene with a surveillance system or virtual fence 100 in accordance with one or more of the various embodiments. In this example, the scene includes various landscape elements such as hills 102 or vegetation 104. Plant cover may be sparse as shown here or may instead be denser with a greater variety of vegetation, including trees or other ground portions that may occlude portions of the scene from one or many surveillance portions. Other more mobile objects may also appear in the scene, for example a cow, such as cow 106 or a person, such as person 108. In some embodiments, a virtual fence 100 may comprise two or more fence elements; one fence element may comprise post 110 with camera box 112 mounted on it. Other fence elements may include post 120 with camera box 122 mounted, and post 130 with camera box 132. In some embodiments, cameras or other optical components may be distributed at different positions on a post as well; for instance, camera box 134 may be mounted at a different location on the post, possibly extended away from the post to improve disparity or for other uses. In some embodiments, posts of various or differing heights may be used, or in some embodiments, optical elements may be mounted to a more continuous fence or wall. Though the figure shows camera boxes mounted at similar heights over the ground, alternating heights of camera boxes mounted to adjacent posts may increase disparity between various camera pairs.

Figure 1B:
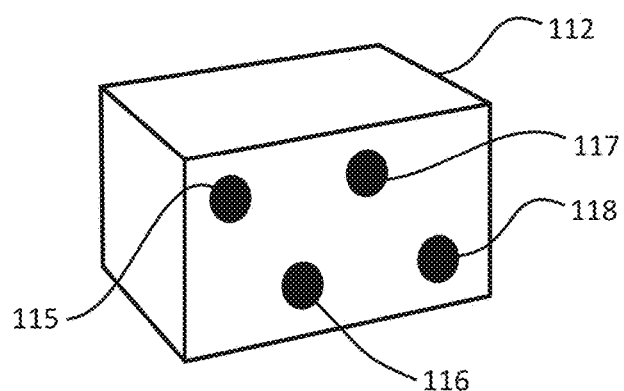
FIG. 1B shows a perspective view of a camera box in accordance with one or more of the various embodiments.

In some embodiments, exact positions may be chosen arbitrarily. One example, for some embodiments, is illustrated by FIG. 1B, which shows an example camera box 112. In this example, box 112 may be considered to be mounted with its front side facing objects in the scene such as hill 102 or other objects 106, 108. The box 112 may include a number of elements, including beam scanner 115, event sensor camera 116, optionally another event sensor camera 117, and optionally a standard frame image sensor camera, such as frame image sensor camera 118. Image sensor cameras may be considered to be similar to others video cameras known in the art, based on CMOS or CCD image sensors, and capturing frames of data, normally with color or gray-scale pixel data. Event sensors may differ from image sensor cameras, as they typically measure fast changes of light level at each pixel; the pixels might typically be triggered individually with a much faster time response as compared to the frame rate of most image sensor cameras, with a time resolution of 1 us or faster, though the event sensors commonly have lower linear resolution than comparable image sensors. Though the surveillance system is described here as keeping optical elements in a camera box such as camera box 112, this is not necessary. In some embodiments, individual beam scanners or cameras may be mounted in various configurations on the pole. Also, in some embodiments, to enable effective 3-D perception for surveillance, there must be overlaps of various fields of view (FOVs) among the various cameras of the system. In particular, for some embodiments, it may be useful to configure the system so that cameras from different posts in the virtual fence have overlapping FOVs. In some embodiments, camera boxes may be mounted to posts along with actuators to allow the system to move the camera box to a different height on the post. In some embodiments, this may allow the system to change the geometric relationship between neighboring cameras on the fly, if the system controller decides that additional information may be obtained in such a way. In some embodiments, this capability may be used for quick deployment of a virtual fence post; once the post is mounted in the ground, one or more camera boxes may be attached near the bottom of the post, whereupon the camera box may be moved using actuators to its desired installation height.

In some embodiments, each post may have one or more beam scanners mounted on it in the same or different locations. In some embodiments, some of the posts may have no mounted beam scanners, though event cameras or other cameras on those posts may still be aimed or configured to detect beams from beam scanners mounted to adjacent or other near posts. Beam scanners may be implemented in a variety of ways, including galvo steering of beams, poly-galvo steering, multiple polygon mirrors, MEMS mirrors, or so on. In some embodiments, beam scanners may emit one or more beams from their output each. Though beam scanners could produce a reproducible pattern, in many embodiments the pattern of beams across the scene may track in many different directions and locations over time to blanket the scene. In some embodiments, multiple simultaneous beams may be matched in different cameras and used to improve surface information measured by the system. Event cameras (also known as dynamic vision sensors) may use CMOS pixels to track light changes but may be based on single photon avalanche diodes (SPADs), photomultiplier tubes (PMT) or other technology to allows fast triggering on relatively low levels of light. Event cameras may or may not have filters attuned to light wavelengths that come from various beam scanners, which may serve to eliminate much of the ambient light interference, which may be more troublesome in sunlight. In some embodiments, some of the event cameras may be configured differently to others. In some embodiments, cameras on the same post (such as event cameras 116 and 117) may have different focal lengths and thus dissimilar FOVs. In one example, for some embodiments, a wider FOV camera, such as camera 116 may be fixed, while camera 117 may be mounted so that it may be physically rotated to point in a different direction, or rotation mirrors or other internal optical system components may be moved to change the effective point of view of such a camera.

In some embodiments, if multiple event cameras may see a particular point on an object in the scene (which might include the ground) where a beam scanner may be reflecting at a particular time, events may be triggered on each event camera, and the positions of the point corresponding the triggered event on each event camera sensor may be triangulated to determine the 3-D position of that point at that time. This may be possible as each camera in the system may be well-calibrated both intrinsically and extrinsically with respect to other cameras, and events at each camera also have a timestamp so that they may be matched between cameras. This process has been described elsewhere but may be improved by correlating related events triggered that may be in proximity in both time and space, and by assembling a trajectory path across objects in the scene. Each trajectory path may be fit to a time-parameterized function in event camera space before triangulation among the cameras, which may give subpixel resolution at any point in event sensor coordinate space, as well as improving the effective time resolution to faster than the time resolution of the event cameras. This works if at least two cameras in the system may see a particular point, but may be improved when three or more cameras, possibly mounted on different posts at different positions, may see the same point.

In some embodiments, exact configuration and choice of various optical elements in the system may be dependent on the desired application of the virtual fence 100. In the example of FIG. 1A, the virtual fence may be watching a scene set in a largely desert area with a small amount of vegetation spread over the ground. In one application, the surveillance system on the fence may be scanning for mobile objects coming into the scene. Although due to wind, various plants 104 may move around periodically, in general their base positions remain stationary. Objects that move through the scene may be of great interest but need to be identified first. If the moving object may be cow 106, the object may be tagged as an object of less interest; it may still be tracked by the system but may be mostly ignored for analysis of intrusion. However, if the moving object may be identified as a person such as person 108 or a ground vehicle, this may trigger an alert for closer surveillance.

In some embodiments, detecting or classifying objects in the scene may be done initially by triangulation. In some embodiments, each portion of the fence may act as one subsystem of the overall virtual fence. As previously mentioned, points in 3-D space may be mapped if at least two of the event cameras in the system may see a particular point as it may be scanned. Thus, in some embodiments, resolution of object data obtained may be limited by the distance of the object to the triangulation subsystem. At each event camera, resolution may be more accurately described as solid angular resolution rather than linear resolution, and so intuitively a farther object may show up on any camera sensor with fewer pixels and less depth resolution than a closer object. However, so long as reflections may be detected at more than one camera, at least the approximate position of an object may be ascertained. Sufficiently near objects may be able to show detailed 3-D surface profiles, enabling fast identification that may improve in confidence level as additional scan stripes across its surface may be observed. In some embodiments, 3-D surfaces may be built up quickly, even though data received may be generally in the form of 1-D curves embedded in 3-D space that represent a beam tracing over the surface of an object. 1-D trajectory curves that intersect each other help tie all scanned points on a single surface together. As an object may be detected farther out, surface depth data may become less reliable, but absolute position in space relative to the cameras should be detectable. Even at farther range, the edges of the object, denoted by the beginning and endpoints of measured surface trajectories may be reasonably clean, leading to at least a recognizable silhouette that may be used for identification. A plant moving in the wind may show up as moving over time, yet its position may generally remain unchanged. The centroid of a moving object that goes across the scene may be detectable even with a low amount of data and in a short amount of time. In some embodiments, this may be useful in locations where there may be substantially more ground cover that may hide moving objects. In some embodiments, if a moving object may be detected that may be not one of the known objects in the FOV of the subsystem, it may be singled out and tracked even if it may occasionally disappear due to being hidden or otherwise obscured behind other objects in the scene. In this case, that particular area range may become an area of interest with additional resources directed to watching and analyzing data.

In some embodiments, if a moving object may be detected, more time may be spent increasing the scanned resolution of the object. In some embodiments, additional event cameras such as camera 117 may be present in one or more camera boxes or mounted on each pole. In some embodiments, camera 117 in each camera box may have a narrower field of view with a higher zoom factor. If these cameras may be mounted rotatably so that they may be turned toward objects of interest, higher resolution scans from the same beam scanner may be detected using a pair of these cameras from different posts. Note, in some cases, for some embodiments, other cues may be used to single out attention. A human staying still for a long time might not trip the detection as a moving object in a setup phase, but nevertheless would still have the silhouette and 3-D shape of a person while stationary for a time. Such a detection could also flag a person or other object type that may be designated by the system for additional searching and attention.

Figure 1C:
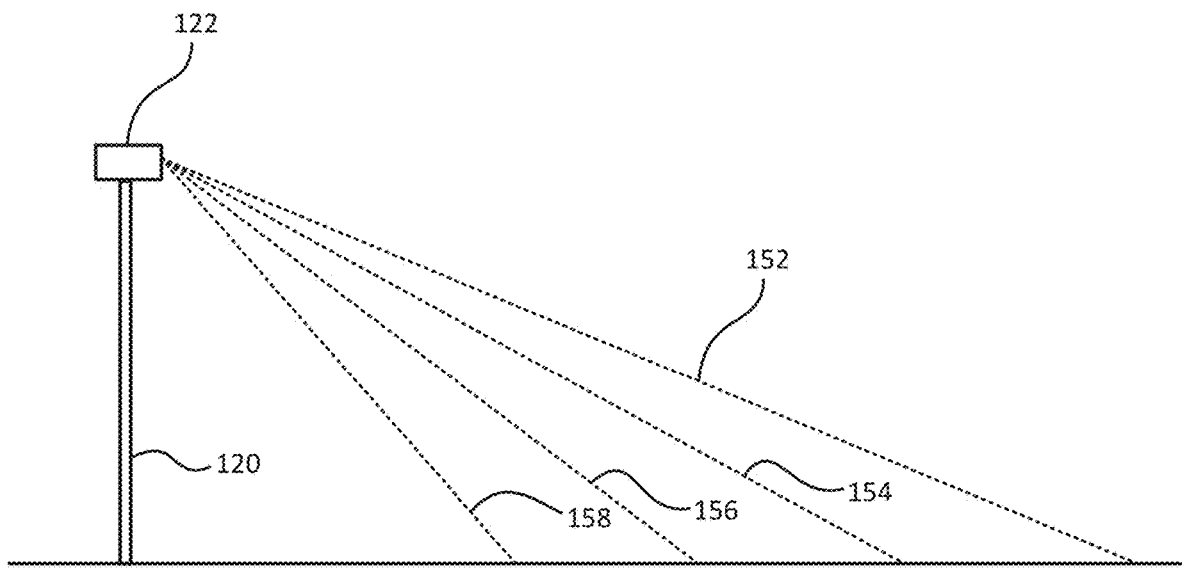
FIG. 1C shows a side view of a single camera box in accordance with one or more of the various embodiments.

In some circumstances, objects at far ranges may have low reflectivity or the beam power may be insufficient to detect the objects at far ranges, in some embodiments, object at far ranges may be detected by increasing a scanning laser power to reach farther distances. This in turn may have its own drawbacks. For example, the same beam at higher power might be concentrated if it scans nearer the fence and create potential eye safety issues if a person or animal were walking too close to the virtual fence. In some embodiments, the power of the beam or beams may be varied by the elevation or other position of the beam. In particular, in some embodiments a virtual fence may be configured to primarily focus its detection to a volume near ground level. In this case, the elevation of a beam may approximately track to the distance of objects to be measured within a range. FIG. 1C shows a side view of one example showing single camera box 122 mounted on pole 120. In some embodiments, a scanning beam may typically scan over multiple angles to blanket at least a portion of the fields of view of cameras on this post and other nearby posts. These may be scanning over the azimuth angle, which may be construed as scanning around the post axis when view from above, and the elevation, which may be the angle of the beam with respect to the beam scanner and the ground. In this example, dotted lines 152, 154, 156, and 158 may represent various elevations of the beam at different times. If the beam has a higher elevation, such as beam 152, the scanning distance where the beam intersects the ground may be longer than a beam with a lower elevation, such as beam 158. In some embodiments, each beam in a beam scanner might be modulated to change the power within an angular range. For example, the beam may be run at a high power between elevations 152 and 154, but may be reduced when the elevation moves during the scanning path between elevations 154 and 156, and further reduced between elevations 156 and 158. Any number of discrete ranges may be accommodated using this method. The ranges may be explicitly separated where the power may be decreased in stair-step jumps between the ranges, or in some cases, the power may be varied substantially continuously (either using analog or digital control) to vary the power with respect to elevation. Either scheme has more advantages than just increasing eye safety, as better results may be obtained at all ranges. If a beam has high enough power to be detected at far range (e.g., >250 m or longer), than this same bright beam hitting a much closer object may reflect so brightly as to saturate the event camera where it hits and obscure other beams or objects near that object. Thus, in some embodiments, adjusting the power to a specific optimum range if scanning objects likely to be within another distance range may give the cleanest results for scanned surface measurements. Note, in some cases, for some embodiments, these ranges may be unlikely to be exact, as objects move across the scene, but also the scene may be rarely homogenous, including various terrain heights and features. For example, if the camera boxes were mounted 10 m high on a pole, a beam that would intersect the ground at 250 m might instead intersect the top of a 2 m tall person at the distance of 200 m. However, varying of powers within certain ranges may still improve the characteristics listed above as compared to constant power systems. In certain locations, power ranges at different angles may need to be adjusted to improve eye safety. The above example was more accurate in assessing the range of a beam when assuming that the scan may be taking place over a flat piece of ground. When the ground may be hilly, higher power beams might on occasion hit a higher hill with more power than would be desired at a close range. In this case, the power may be modulated at particular scan angles to reduce the power for eye safety or other reasons. Ahead of scanning normally, in some embodiments, the topological profile of the land surrounding the virtual fence may be scanned to determine if power levels should be adjusted to accommodate for this. In some embodiments, details of the scene might be added in opportunistically; while the system detects that there may be gaps in the 3-D data, it may occasionally ramp up the power to capture additional details in those areas once the lower power scans have detected no eye safety issues.

Figure 1D:
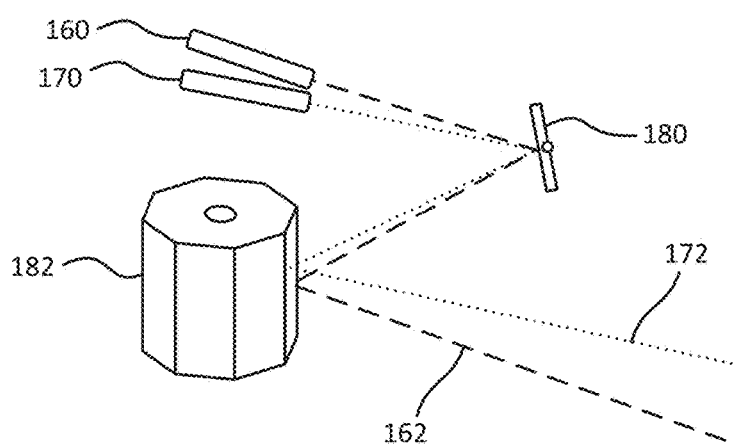
FIG. 1D, illustrates a poly-galvo scanner in accordance with one or more of the various embodiments.

In both embodiments depicted in FIGS. 1C and 1D, additional precautions may be taken to promote eye safety. In some embodiments, if the system user/administrator determines that it may be difficult to obtain detailed scans without increasing the power in dangerous situations, it may temporarily change wavelengths used. For example, in some embodiments, the primary wavelength for beam scanners may be 405 nm, barely in range of detection by the eye at low powers, but still potentially a source of eye damage. In some embodiments, a secondary mode may switch to lasers using a wavelength 1550 nm, or another wavelength that may be considered eye safe. At the same time, in some embodiments, the cameras may switch to a different light filter corresponding to the secondary wavelength, or in some embodiments, may switch event cameras that may be configured to optimally measure events at the safer wavelengths.

In some embodiments, varying the power of beams scanned at different elevations may be accomplished by using different lasers with different characteristics. One example of this may be shown in FIG. 1D, which illustrates a simple poly-galvo scanner, though other scanner types may be used here as well. This example shows multiple lasers being scanned by the same scanning elements, but this could also be accomplished by each beam having its own separate scanner. In this example, for some embodiments, the scanner includes two lasers, laser 160 and laser 170 outputting beam 162 and beam 172 respectively. In this example, for some embodiments, the beams reflect off a vertically rotated galvo (galvo 180), and then off a horizontally rotating polygonal mirror (mirror 182). The galvo may be aligned in such a way as to rotate the output of the beams to adjust their elevation angle within a range, and polygon 182 scans the azimuthal angle of the beam, though these exact configurations may be arbitrary, and they may be aligned with some other set of axes. In this example, for some embodiments, laser 170 may be set to a higher power as compared to laser 160, since it may be output at a higher elevation and thus a longer range, in some embodiments, other adjustments may be made in this configuration; for instance, focusing of the beam to a particular size may be customized for each laser. In this way, the beams may be adjusted to give the improved signal reflection at each distance range. Also, in some embodiments, modulation of the beams may additionally occur if needed to adjust for other parameters.

Figure 1E:
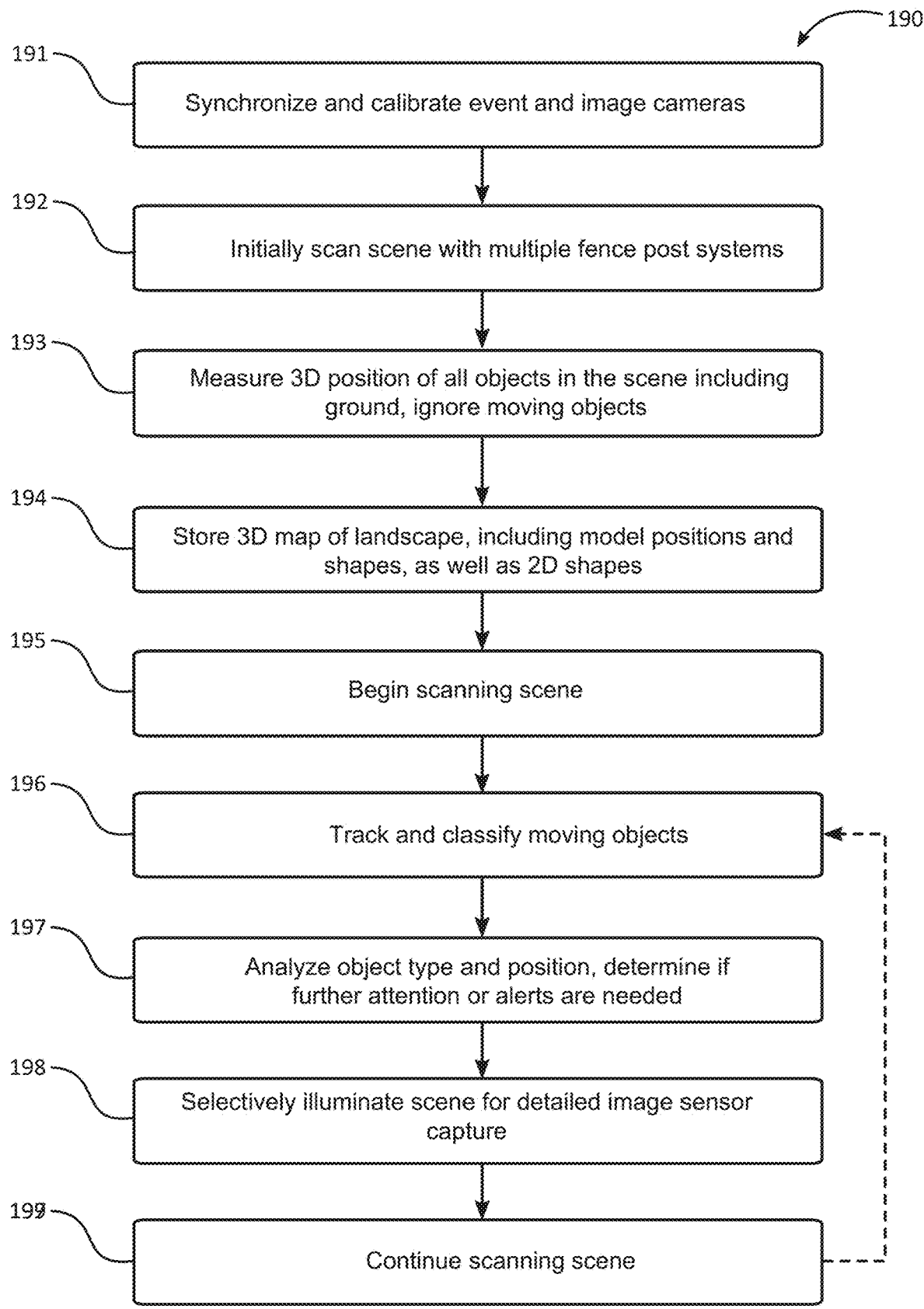
FIG. 1E illustrates an overview flowchart for a process for using virtual fences in accordance with one or more of the various embodiments.

In some embodiments, a general process for starting surveillance and scanning scenes may be described in FIG. 1E as process 190. In step 191, in some embodiments, timing of each event camera may be synchronized to properly calibrate up one or more measured trajectories at each camera. For example, in some embodiments, this may either be done by signaling among the towers a time signal or directly using measured trajectories that may cross on each camera; by repeating this multiple times to determine the time discrepancy between each camera, and repeated occasionally if there may be significant drift. If that may be done, the position of the cameras may be determined through scanning trajectories on objects in the scene or the ground, and using bundle adjustment or other methods to determine position or orientation. In step 192, in some embodiments, an initial scan of the environment may be performed using the entire system over an arbitrary time. Accordingly, in some embodiments, if camera boxes pointing in multiple directions may be present, these may be scanned at the same time, enabling the overlap between those cameras to be used to find object surfaces. In step 193, in some embodiments, various objects in the scene may be tagged as stationary or moving (in this case, moving refers to permanent movement of the center of mass of the object, not swaying of trees or plants). In some embodiments, a 3-D model may be constructed of each object in the scene and stored as part of the landscape. Thus, the position of each stationary object may be known with respect to each camera in the system. In some embodiments, if camera posts sway and momentary deviations of the posts may be uncorrelated, they may be dynamically calibrated, and the 3-D map of objects may be related to new positions. In some embodiments, stationary objects may be identified or classified at this step. In some embodiments, 2-D object data at the event camera level may be stored. In some embodiments, barring movement of each camera, a stationary object may roughly appear at the same position and may be used to detect movements of the camera or other objects alternatively. In some embodiments, 3-D curve fit splines taken from trajectory paths may be stored for each object as well to roughly delineate the shape; this may be useful if a full 3-D model may be not generated for each object.

In step 195, in some embodiments, the scanning surveillance of the scene may begin. In step 196, in some embodiments, moving objects may be detected. All objects in the scene may continue to be scanned and detected as well for changes but moving objects may be flagged for extra attention. If possible, moving objects should be classified as to type. In step 197, In some embodiments, certain types of animals may be present in the scene; these animal types may be tagged as allowed classifications indicating that alerting may not be needed. Nevertheless, allowed classifications of moving objects may be tracked for movement, and if the animal or other moving object has movement patterns that may be uncharacteristic of animals, they may be tagged for further analysis. Also, in some embodiments, moving objects such as people or vehicles that may not be in an allowed classification of objects may be indicated to enable additional identification actions to be performed may be done, for example, directing higher resolution event cameras to scan those objects with higher precision, or directing image sensor cameras to capture images of the object. Optionally, in step 198, in some embodiments, subjects may be selectively illuminated for better image capture. In step 199, in some embodiments, the scene may be continuously scanned and the process may loop back to step 196.

In some embodiments, the system may be configured to use higher power settings to detect the presence of objects with little or no reflectance. To detect an object moving, two or more event cameras may observe the scattered reflection from the beam to determine the object position. However, in some embodiments, if a person or other object were cloaked in a material that absorbs most light, including a wavelength that a virtual fence surveillance system may be scanning, this object may not be detected immediately. However, absence of object portions may be noticeable. In one example, for some embodiments, a virtual fence, such as virtual fence 100 may be on a perimeter surrounding a building rather than on a boundary line. Generally, the surveillance system would be able to determine positions of known objects in the scene. In some embodiments, this may include a building that may be observed along with other objects that may be detectable in the scene, which may be within range such that event cameras would reliably detect scans and trajectory paths scanned over it. In some cases, detectable objects may be stationary but moving objects may be used for this purpose so long as their position may be substantially known or measured at all times. In this case, a break in trajectories closely associated with the side of the building may be evidence that there may be moving objects with low reflectivity in the scene. The "hole" left in the event camera trajectories may be correlated and matched with each camera to determine if there may be a possible object. In some embodiments, if the "hole" moves and may be tracked reliably, an alert may be generated. In some embodiments, portions of an object such as a building in a scene may be tagged to improve response time. In some embodiments, retro-reflectors may be placed at various positions on the building. These may be discrete components or may be sections of retro-reflective paint or other coatings. Though these wouldn't directly show up at the event camera sensors, a simple photodetector sensitive to the scanned wavelength and placed substantially co-located with the beam scanner may see a spike in energy every time the beam scanner traversed a retro-reflective portion. Since the retro-reflectors may be localized in position as well, if the expected retro-reflective signal may be missing if it would otherwise be expected to be observed in a scan, this may be more evidence that there may be an object of low reflectivity occluding the retro-reflector, which may trigger alert.

In some other embodiments, a virtual fence may be configured to scan objects near the ground but may also additionally detect objects in the air as well. In this case, the beam may be scanned from higher elevations than as described previously. The power may be constant for multiple ranges but may also vary as previously described in various embodiments using one or more lasers. Since a much higher volume of space would be detected than if scanning ground level objects, the power may not simply vary as a function of elevation as before (although this same scheme may be used for elevations of scanned beams intended to detect ground objects at the same time). In some embodiments, objects flying through the air may occur at varying distances, and it may be difficult to predict at what range they may enter the FOV of cameras in parts of the system. In some embodiments, this may be mitigated by configuring the various subsystems to communicate with each other along the length virtual fence. For example, if a flying drone were detected moving along the fence within its detection range in one subsystem of the fence, that subsystem may communicate the measured and predicted movements of the drone as it moves into other subsystems of the fence. The drone may be constantly detected as it moves, since cameras on the various posts may be configured to have multiple overlapping FOVs where an object may be seen at most positions along the virtual fence.

In some embodiments, larger scanning beams may be used to scan positions where there may be fewer objects providing a signal reflection. This may be the case if scanning for objects in the air, where reflected signals may be much less common than on the ground (e.g., non-moving objects on the ground may be continuously detected, and provide background signals even if not moving). In the air, if smaller beams may be scanning at low or high power do not find much or any signal in an area of scan, the beam may be switched to a larger-sized, higher power mode to increase the chances of hitting an object on a scan. In some embodiments, the beam itself may be modified with a different focusing lens subsystem and the power increased, or else a different beam scanner may be activated. In this case, because the beam intensity per unit area may not be significantly different than with a relatively smaller width beam, eye safety of pilots in planes, for example, may still be within acceptable range. In this way, the system may selectively cover the area to be scanned with a larger sized beam, and thus fewer sweeps in the same time period may be used over the scanning range. If a signal may be detected, the system may switch back to a smaller beam in that area to detect fine details including shape, position, and velocity of an object. Though this may find more use if scanning into the air where there may be a higher chance of having reduced signal return strength in a scan, it still may be useful in scanning ground areas at farther distances where other signals may have been detected. Though the various event cameras may detect this larger "search" beam, in some embodiments, a camera substantially co-located on the beam scanning optical axis may detect back scattered return signals to localize objects during the scan, and using the position of the scanner, feedback into the system may approximate position to search with a narrower beam. In a variant, a photo-diode, or else a low-latency pixel array may be used instead of a camera.

Nevertheless, in some embodiments, scanned beams elevated and scanned through the air may be modulated in power for better signal recovery. Though eye safety may be less of a consideration, nevertheless, there may be sensitive equipment that may be damaged by using high power if too close. In one embodiment one or more beams may be scanned at low power through the near airspace. If no objects may be detected, higher and higher powers may be used for the scan through the space. In some embodiments, this process may be periodic, where after an arbitrary time, the beam power may be cycled back to lower, particularly if an extremely bright signal may be detected entering the FOV of an event camera. In some embodiments, rather than modulating laser power, multiple lasers may be used that may be sequentially (or simultaneously) switched on while scanning over the airspace. The multiple lasers may be configured to point in different directions or may alternatively be pointed and scanned to cover a similar solid angle from the scanner.

In some embodiments, the position of various optical elements on the various posts of the virtual fence may be somewhat dynamic. Before use, a triangulation subsystem must be calibrated. Because the scanning event cameras may use various features in the scene, including artificial features such as trajectory crossings on objects, the position of the cameras may be ascertained with respect to each other very quickly. Once initial calibration has been done, this may allow for dynamic calibration to occur many times a second. In some cases, wind or other factors may cause movement, swaying, or other rotation. These movements may be detected using the optical systems alone and the 3-D data adjusted in real-time to adjust for these movements. If cameras or camera boxes may be configured to be able to move themselves vertically on the fence post, this may be calibrated in the same manner.

In some embodiments, the virtual fence surveillance system may choose which data from cameras to combine to adjust triangulation density or depth, occlusion, or other factors. For example, one or more virtual fence posts may include event cameras with relatively wide angles. Though one common configuration ensures that cameras from adjacent posts may have significant overlap of FOVs, in other configurations, portions of event cameras on one post may overlap areas with event cameras on farther, neighboring posts. In some embodiments, laser power may be modulated higher, or alternatively one or more beam scanners may be switched on that have higher power to increase the range of the system. Lateral resolution (and associated depth resolution) of a triangulation system may be a function of range to the object being measured, but also a function of disparity of two elements in the system (in this case two cameras on far posts. By increasing the baseline distance between the two cameras used in the virtual fence, the resolution may be increased provided the power of the beam may be increased to allow sufficient reflected signal back to each camera. One example of this may be using data from camera box 112 and camera box 132 to achieve this, or other farther cameras in the system. Note, this may be different from using a narrow FOV camera to improve resolution, as it may not require additional aiming, though in specific embodiments one or more wide FOV event cameras in the system may be addressably rotated under desired circumstances. In some embodiments, virtual fences, such as virtual fence 100 may be associated with central server that may make decisions on how to interpret the data, and determine if wider baselines may be needed to discern other details. In some cases, portions of an object may not be visible to one of the event cameras, and neighboring event cameras with overlap on the object may be enabled to "look around" occluding obstacles to obtain data on these objects.

As mentioned before, a fence post may include one or more image sensor cameras, such as image camera 118. In some embodiments, image sensor data may be combined with surface data from event camera scans to improve the output. Image sensor cameras may also be able to detect the scanned beams from beam scanners around the scene. As such, though they do not obtain detailed timestamp information of where each beam reflected as event camera do, other details such as beam crossings, trajectory beginnings and endings on objects, or others may be readily detected. Also, in some embodiments, these data may be used to accurately calibrate the position or orientation of the image sensor cameras with respect to event cameras in the system. In some embodiments, image frames may then be seamlessly merged with object model data, since the position of 3-D objects in the scene may be mapped to particular portions of each frame image with relatively low amounts of computation as compared to systems with video scene analysis alone. Since these systems may often have lower power requirements (in some cases they may be quite remote and may be run using solar power and batteries), computing at the edge with lower power may be quite advantageous. Image sensor camera data may be used in other ways, especially at far distances where 3-D shape data may be less distinct. In some embodiments, timestamp data from event cameras may determine where edges of objects start and stop. These may be correlated to generally higher resolution image sensor cameras to improve detection of silhouette shapes by the system. In addition, as the camera systems move somewhat, e.g., due to fence poles moving because of wind or other factors, the position of silhouettes of otherwise stationary objects may be used as secondary indicators of the movement of the cameras on the pole for supplemental data or positions for dynamic calibration.

In some embodiments, the surveillance system may selectively illuminate the scene to improve image sensor camera capture quality. In daylight hours outside, there may be sufficient light to capture portions of a scene in high detail without additional lighting on an image sensor camera, such as camera 118. In some embodiments, if lighting may be poor, additional lighting may be needed to add further data. If the system has detected a moving object and the triangulation data capture may be not sufficient to identify or classify the object, the image sensor camera may be employed to supplement this. In these cases, in some embodiments, secondary beam scanners may be used for selective illumination. The secondary beam scanners may be mounted within camera boxes or mounted separately on poles, but in both cases, its position should be well calibrated with respect to other cameras on the virtual fence post. If the 3-D position of an object of interest has been located, as mentioned previously, the position where that object should show up on image sensor camera 118 may be predicted. The secondary beam scanner may be turned off until needed, or left scanning in a low power mode. If activated, the beam scanner may be modulated to increase the power and directed to "paint" the object with additional illumination. This may be done precisely since the position of the object may be calculated with respect to the secondary beam scanner, e.g., the angular range of scanning to point toward the object to be illuminated may be calculated based on calibration of the secondary beam scanner and the object position in 3-D space. The beam scanner may be tightly controlled so that it scans around the area of the object, or in some cases, the beam may be configured to scan similarly to other beam scanners on the post such as beam scanner 115 which may be configured to blanket the scene area with scanned light using a non-repeatable scanning pattern such as a Lissajous curve. The illumination beam may be then modulated to turn on completely, or else turn on at high power when the beam is pointing toward the object and lower its power as it moves off the object. Selective illumination may save power for the overall system but may also make the system less obtrusive. Selective illumination need not continue for a long time; it may be sufficient to illuminate the target for as little time as it takes to capture one image frame on the image sensor camera. In some embodiments, the secondary beam scanner may output monochromatic light, but in other cases it may emit a broad-spectrum light that may be better for color images. The broad-spectrum light may comprise several lasers combined into a single beam, but in other cases, it may use a low wavelength beam (e.g., 405 nm) through a phosphor element to create white light. In some embodiments, rather than use a separate secondary beam scanner, a switchable phosphor element may be used in front of main beam scanner 115. This may be possible in systems where the main beam scanner has a laser that may be quickly modulated and may be of high enough power to provide illumination for the image sensor camera. In some embodiments, the secondary beam scanner may emit IR light to remain even more unobtrusive to the object being illuminated; the IR light may be in the near IR, or it may be located in an eye-safe region such as 1550 nm. In one example, a laser through a phosphor may be focused so that it has a divergence of 1-2°. At 100 meters, that would give a spot of 1.7-3.4 meters in width; at this size, it may remain eye-safe even at higher powers (such as several watts or more). The image sensor may have significantly more resolution than similar event cameras in the system, thus adding a high resolution images to the data stream. Though additional illumination may be used at night, in some embodiments selective lighting may be used during daylight hours to improve contrast.

Figure 2A:
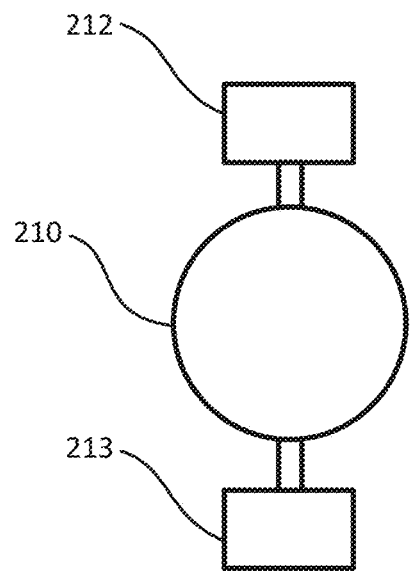
FIG. 2A shows a top view of a post in a virtual fence with more than one camera box mounted in accordance with one or more of the various embodiments.

In some embodiments, multiple directions may be covered using the same post in a virtual fence. For example, post 120 may have two, three, or four camera boxes mounted to it, with each box pointing substantially along a different axis around it. One example of this may be seen in FIG. 2A, which shows a top view of a single post 210 with two camera boxes 212 and 213 mounted on it, pointing in opposite directions. Thus, a virtual fence comprising posts similar to post 210 with multiple cameras may surveil on both sides of the fence. Camera box 212 and camera box 213 (or individual optical elements therein) may be substantially the same for symmetrical coverage in each direction, but in some embodiments, higher quality components for increased resolution, faster time response, or other metrics may be used on one side of the virtual fence. In some embodiments, this may be done if it may be desirable to monitor both sides of a border, but increased attention or range may be needed on one side more than the other.

In some embodiments, more than one line of posts may be present in the virtual fence, in which case the fence may be monitoring a larger area with some depth. An example of this may be shown in FIG. 2B, which shows many posts similar to post 210 with multiple camera boxes placed in an area. In this example, the posts and camera boxes may not be drawn to scale. Each post may have several camera boxes, or may have a single camera box. In either case, a larger area may be watched, which may make it more difficult to cross the fenced area without detection. Variations in scale may be possible as well. Because the virtual fence may be able to provide surveillance a long distance away from any one row, in some embodiments, each row of the fence may be placed at a much greater distance apart than the spacing between posts in a single row.

In some embodiments, some optical elements may be shared between different optical subsystems. FIG. 2C shows one example, which may be similar to FIG. 2A, but includes a beam scanner 220 outputting beams of light in multiple directions simultaneously. The same rotating element may reflect various beams in all directions where cameras on the post are viewing. This beam scanner may be the only beam scanning element mounted on the post but may supplement other beam scanners. The top of the post may include other moving optical elements, such as an event camera or an image sensor camera, which may rotate to view all around the post. Optical elements may be visible or may be hidden behind a dome or other shield that may protect them from the elements but may also disguise which direction they may be pointing at any moment.

In some embodiments, virtual fences may be deployed underwater. Though these may be used for monitoring of people and underwater vessels for surveillance activities, they may be used to monitor wildlife. One common application in shark-infested waters may be to place a shark net at some distance from the shoreline to make swimming safer at a beach. This may be replaced by use of a virtual fence as an early warning system. One example of an underwater virtual fence 300 may be shown in FIG. 3A according to some embodiments. View 310 is a perspective view of a beach 311 with shoreline 312. The water may be shown in partial cross-section, where the surface of the water (e.g., surface 313) and seafloor 314 are denoted. In this example, underwater virtual fence elements 315 may be shown in a line roughly parallel to the shore, though the exact positioning may be arbitrary and dependent on application. View 320 shows a top view including the shoreline 312 and several virtual fence elements 315. A side view of one virtual fence element may be seen in view 330. Here anchor 316 may be placed on the seafloor. The anchor may be attached to the surface or may simply be weighted down so that it remains in the desired position. In some embodiments, anchors may be attached to a floating buoy, such as floating buoy 319 by a cable, such as cable 317. In some embodiments, one or more camera boxes, such as camera box 318 may be attached to cable 317. The camera boxes on underwater fence element 315 may serve a similar purpose to camera box 112 in FIG. 1A, and may include one or more event cameras with an optional frame image sensor camera, as well as a beam scanner. In some embodiments, camera boxes may be configured to capture data from more than one direction using additional optical elements (e.g., the system may be setup to view the water facing the shoreline and also the water on the other side of virtual fence 300). In some embodiments, the buoy may also have elements of a camera box as well; some may have ability to observe into the sky above the water surface, and some may have only capability of observing and scanning under the water. Virtual fence elements 315 may need to be placed in locations where shipping or other activities may collide or otherwise interfere with the virtual fence. In some embodiments, the length of cable 317 may be shorter than the depth of the water at that point; in these cases, the buoy would still provide buoyancy to keep camera boxes off the sea floor but not project all the way to the surface. Here, the buoy itself may be a camera box orientated to look up toward the surface as well as towards surrounding areas. In some embodiments, anchor 316 may have camera box elements contained within it to view its surroundings. In some embodiments, the camera box elements in the anchor may supplement other camera boxes connected to cable 317 or buoy 319. In particular embodiments, an anchor with camera box elements may be used alone without attached cable 317 or any other floating portions attached; this may be useful in places where the water may be sufficiently shallow that the system may detect objects in the water up to the surface. In some embodiments, various configurations may be mixed over the entire system. For example, in some embodiments, one virtual fence element may have an anchor, cable, a camera box attached to the cable, and a buoy adjacent to another anchor with only a camera box built in.

In some embodiments, the wavelength of beam scanners may be tuned to optimize transmission through water. For example, light at a wavelength of 460-470 nm may have a low absorption coefficient in the visible or near visible spectrum; if chosen, this may increase the range of possible detection, though other wavelengths may be used for other purposes. Detection may be accomplished similar to methods described for virtual fence 100 in FIG. 1A, including triangulation. In some embodiments, to achieve effective depth resolution, the virtual fence elements may be placed at a distance from each other to achieve disparity sufficient for triangulation. Similar to virtual fence 100, underwater virtual fence system 300 may detect objects position, velocity, shape, and size. Shape may also include motion, and the system may detect by scale whether the object may be a fish or a human. Type of movement deformation may also be detected; a human, fish, or dolphin may each have completely different methods of propulsion through the water which may be tracked. Fish-type movement combined with a certain size may, for instance, trigger an alarm for a potentially dangerous shark moving in the water near that location and whether it may be moving toward the shoreline or staying far away. Continuing analysis of a shark's movement may improve predictions of future actions by the target; in some cases, wildlife may be identified as dangerous but appear to pose no immediate threat, thus reducing false alarms. In some embodiments, a system may concurrently be watching the water near the shoreline to detect humans swimming in the water; if there may be no one swimming, the type of alerts may be different, or may not be as immediate. In one variant, a virtual fence watching normal swimming areas may be able to detect types of motion while humans may be swimming; a swimmer making characteristic motions that may indicate distress or drowning may trigger an immediate alert to a lifeguard or other watchers.

In one or more of the various embodiments, virtual fence 100 in air may use relatively low power lasers and still receive good signal-to-noise levels of reflection or scattering off distant objects. However, in underwater conditions, even if the wavelength of the beam scanners may be selected for efficiency, attenuation over distance may be more than in air, and often a stronger laser power may be needed to achieve reasonable signal. Another factor underwater that may be accounted for may be turbidity that may heavily scatter laser light through the water. Though similar effects such as fog or other particulate matter may affect performance in land-air based virtual fences, turbidity may be a stronger factor, particularly near surfaces with significant water currents or other wave or tidal movements. In some embodiments, camera boxes with scanners may monitor the scattering from their beam scanners for retro-reflection toward the source and adjust the power of the laser higher as the perceived turbidity levels increase. Even in areas where there may be significant levels of particulate matter that may obscure objects even at relatively close range, the underwater virtual fence 300 may be able to detect object surfaces. If the system notices high back scattering, light that reaches the object may be somewhat intermittent as the laser beam may have varying amounts of light that hit it as the light scattering varies.

Figure 3A:
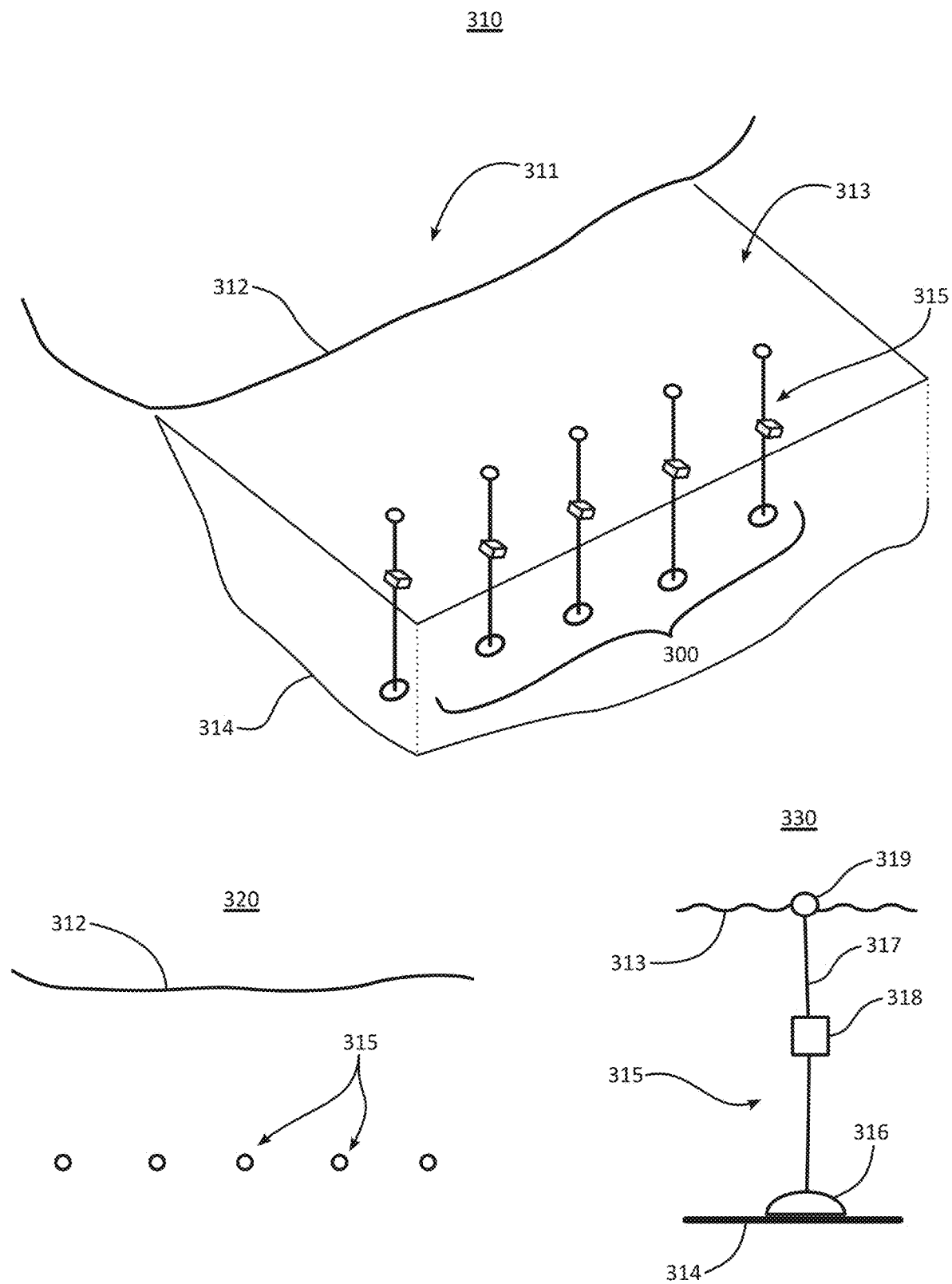
FIG. 3A shows a view of an underwater virtual fence in accordance with one or more of the various embodiments.
Figure 3B:
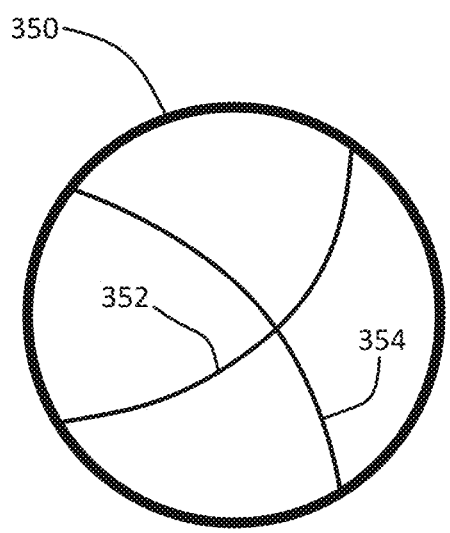
FIG. 3B shows sample trajectory paths that a scanned beam may take over the surface of a sphere if water was clear in accordance with one or more of the various embodiments.
Figure 3C:
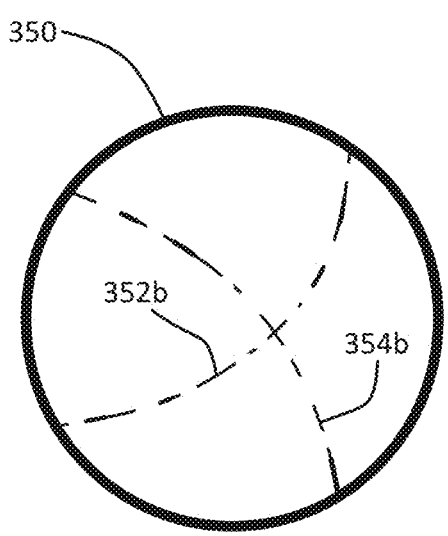
FIG. 3C shows sample trajectory paths that a scanned beam may take over the surface of a sphere if the water was turbid in accordance with one or more of the various embodiments.

An example of this is shown in FIGS. 3B and 3C. FIG. 3B shows an object, in this case a sphere 350. Trajectories 352 and 354 may be sample paths showing the trajectory that a scanned beam may take over the surface of the sphere 350 if the water was clear. FIG. 3C shows the same sphere 350 but represents the same scanned beams if they passed through turbid water on the way to the sphere from the beam scanner. Path 352b follows the same surface portions as path 352, but may be quite variable. In certain portions, the entire beam intensity may hit the surface, in others the power may be decreased, and in still others no detectable beam may impinge on the surface leaving gaps in the trajectory. The same may be true of paths 354 and 354b. In some embodiments, two or more event cameras may image the sphere surface and may detect portions of the trajectories 352b and 354b that may be bright enough to trigger their event pixels. In some embodiments, cameras may have somewhat different output depending on how they may be configured, as well as having different perspectives based on their disparity of position. In some embodiments, light captured at the camera boxes may be somewhat less sensitive than the scanned beam approaching the object, since the event cameras have collection lenses that may image each spot using light in a cone that scatters from the object at that point; even if some reflected light may be blocked from returning to the camera, it should still be detectable as signal. Signal analysis under these conditions may differ somewhat from signal obtained in clearer water, since rather than measuring unbroken event trajectories over each object as it may be scanned, the perceived trajectories may appear at the camera to be less connected with many gaps. Nevertheless, surface details may still be extracted from the data. In general, even broken trajectories on an object may follow a relatively known path as they traverse the object. Calculated 3-D fit functions may still appear on a surface with time and space correlations while scattered light that may be measured at the event cameras may appear noisier, with cloud-like positioning that may be uncorrelated with a surface. Normally trajectories may be longer while the beam follows the same surface, but the process may be changed somewhat if the system determines that the water may be turbid enough to affect results. This may be done using backscattering as mentioned before or may be inferred directly from the data if only short, broken trajectories may be obtained. Even though they may be broken, candidate trajectories may be assigned to a group of short trajectories. Using only the correlated data, a surface profile may still be reconstructed. At this point, the surface profile of the object may still be uncertain, but now that proposed surface may be used to reconstruct other broken trajectories on that same surface. If other trajectories that come close in time (sufficiently close that the object may not have moved very much in between), the proposed surface may be assigned. Though this analysis may be done for underwater turbidity, in some embodiments, this procedure may also be useful in a land-based virtual fence 100 under conditions of high intermittent scattering such as snow, or possibly even under foggy conditions where at least some light may be detected at an object at distance.

Figure 2B:
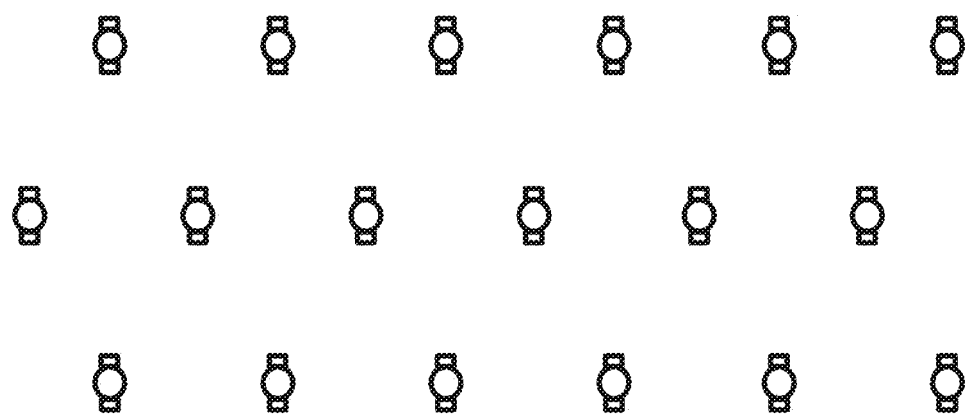
FIG. 2B shows a top view of an alternate configuration of virtual fence components that covers a larger monitoring area with depth in accordance with one or more of the various embodiments.
Figure 2C:
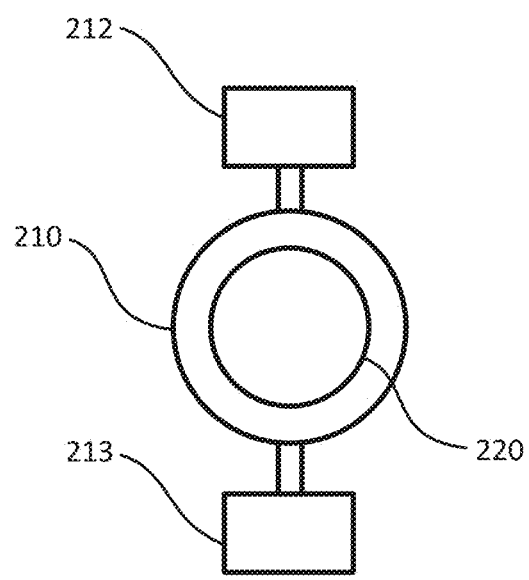
FIG. 2C shows a top view of a post in a virtual fence with more than one camera box mounted in accordance with one or more of the various embodiments.

In some embodiments, virtual fences 300 may be laid out in a line as shown in FIG. 3A, in some variants, a wider area may be monitored by using a layout similar to FIG. 2B. Virtual fence elements 315 may detect objects toward one general direction, or else may have additional camera box elements attached that point in various directions around the element 315. In some embodiments, camera boxes in virtual fence 100 may be arranged to communicate with each other to transmit data on events captured, trajectory curve fit functions, timing, or video data. This may be needed so that trajectories may be mapped from different cameras for triangulation; data may be analyzed at a central server, in some embodiments, image processing may be distributed among computer located at various camera posts.

In some embodiments, communication between virtual fence elements 315 may be achieved through underwater cable connections. The various elements 315 may be connected through electrical or optical cables in a chain or mesh fashion. Direct connection may not always be practical in every environment. Accordingly, in some embodiments, virtual fence elements 315 may communicate through acoustic waves using various communication standards. In some embodiments, virtual fence elements 315 may communicate through laser point to point connections. These may use similar wavelengths as the lasers used for beam scanning, or they may use different wavelengths. One difficulty with this embodiment may be that the position of each element 315 must be known to at least one other element 315 so that they can properly point a transmission beam toward a receiver on the other element 315. Generally, this may be determined using dynamic calibration of the system, similar to the process used on virtual fence 100, where various scans over the scene may be progressively used to refine the position, and continued measurements may be done to adjust for various camera boxes moving or swaying. However, this may require communication between elements first to compare signals, though the initial calibration may be done in a very similar manner to a system in air. In some embodiments, virtual elements may communicate with each other using acoustic modulation for initial calibration; once the positions have been found of each element 315 with respect to the others, laser point to point communication that enables higher bandwidth measurements may commence. Dynamic calibration thereafter may be more important underwater than in air because it may be more likely that individual pieces of the system may move more with respect to one another than in post-mounted systems. However, since calibration may happen many times a second, even with constant movement, the virtual fence elements 315 need not go out of contact with one another, but if they do, they may be reconnected or re-calibrated using a similar procedure again.

In some embodiments, analysis of triangulation results may be done in self-contained computers included within the virtual fence elements 315. However, in some embodiments, the controllers of each element 315 may be simpler, with analysis done by computers at remote locations. In either case, communication of the underwater virtual fence 300 with an external device may be needed to report some results. In some embodiments, one or more buoys 319 on the surface of the water may have radio systems that enable communications with a base station computer on the shore (or perhaps on a nearby boat or ship). In some embodiments, one or more anchors 316 may have additional cable connections to base stations on the shore for data transmission; in some cases, this cable may transmit electrical power to the system. In some embodiments, each virtual fence element may be self-contained, with a large battery that may be later replaced or recharged.

Figure 4:
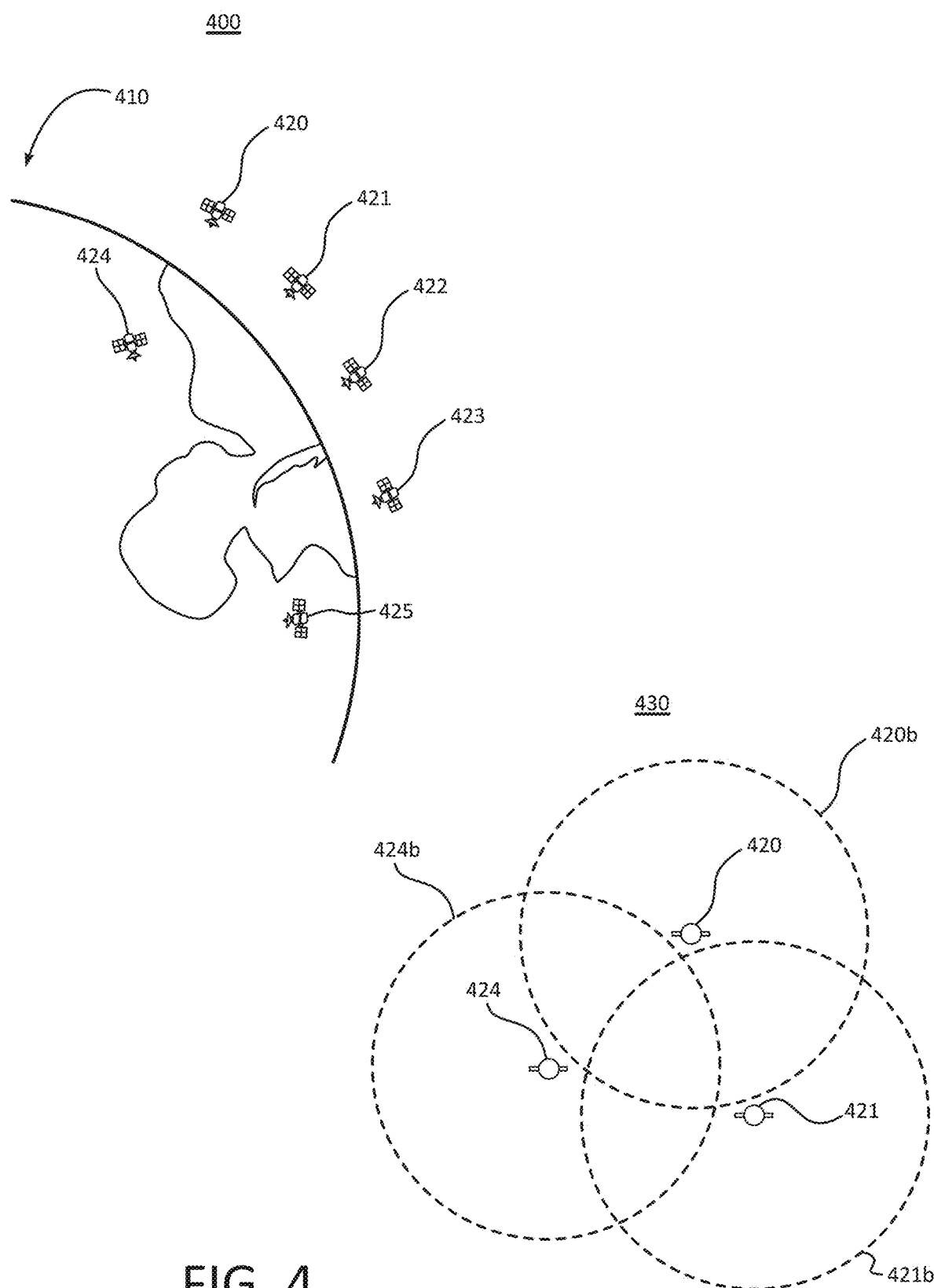
FIG. 4 shows several views of several satellites orbiting a planet acting as a virtual fence surveillance system in accordance with one or more of the various embodiments.

In some embodiments, virtual fences may be installed in space. Though satellites may be watched from ground-based stations using these methods, satellites may be organized into a mesh 3-D perception system, acting as a mobile "virtual fence". FIG. 4 shows one example of this in view 400, where various satellites 420, 421, 422, 423, 424, or 425 may be orbiting earth 410 in low earth orbit. Satellites at this height may move in stable orbits but may appear irregular, where various satellites may be in range at the moment but be far apart at later times. Even though the range may in some cases be too far to see objects on the ground, objects closer to the satellites may be scanned to see if anything may be on a collision course with a satellite. Satellites in low earth orbit (LEO) may be numerous and may be able to share fields of view with one another looking in one direction. View 4B is a close-up view showing one example of this. Circle 420b is a FOV of an event camera on satellite 420 pointing down toward the earth at an arbitrary height. Circles 421b and 424b may be FOVs of satellites 421 and 424 respectively. In some embodiments, if there may be overlap between any two or more cameras, scanning may be done from one or more of the satellites and triangulation used to determine the positions of detected objects. Unlike virtual fences in air or water, satellites in LEO may continuously move with respect to each other. In some cases, areas of overlap between satellites may be constantly changing, or positional knowledge of each satellite may be important for accurate triangulation. In some embodiments, sufficient objects may be detected to continuously update the position similar to dynamic calibration described earlier. In some systems, objects may be detected infrequently, thus calibration methods using scanning alone may be imprecise. However, GPS and other means may be commonly used to locate these satellites, particularly if they may be additionally in use as a communication network where knowledge of position for handoff of signal from one satellite to the next may be necessary already.

Although the invention has been discussed with respect to various embodiments, it should be recognized that the invention comprises the novel and non-obvious claims supported by this disclosure.

Illustrated Operating Environment

Figure 5:
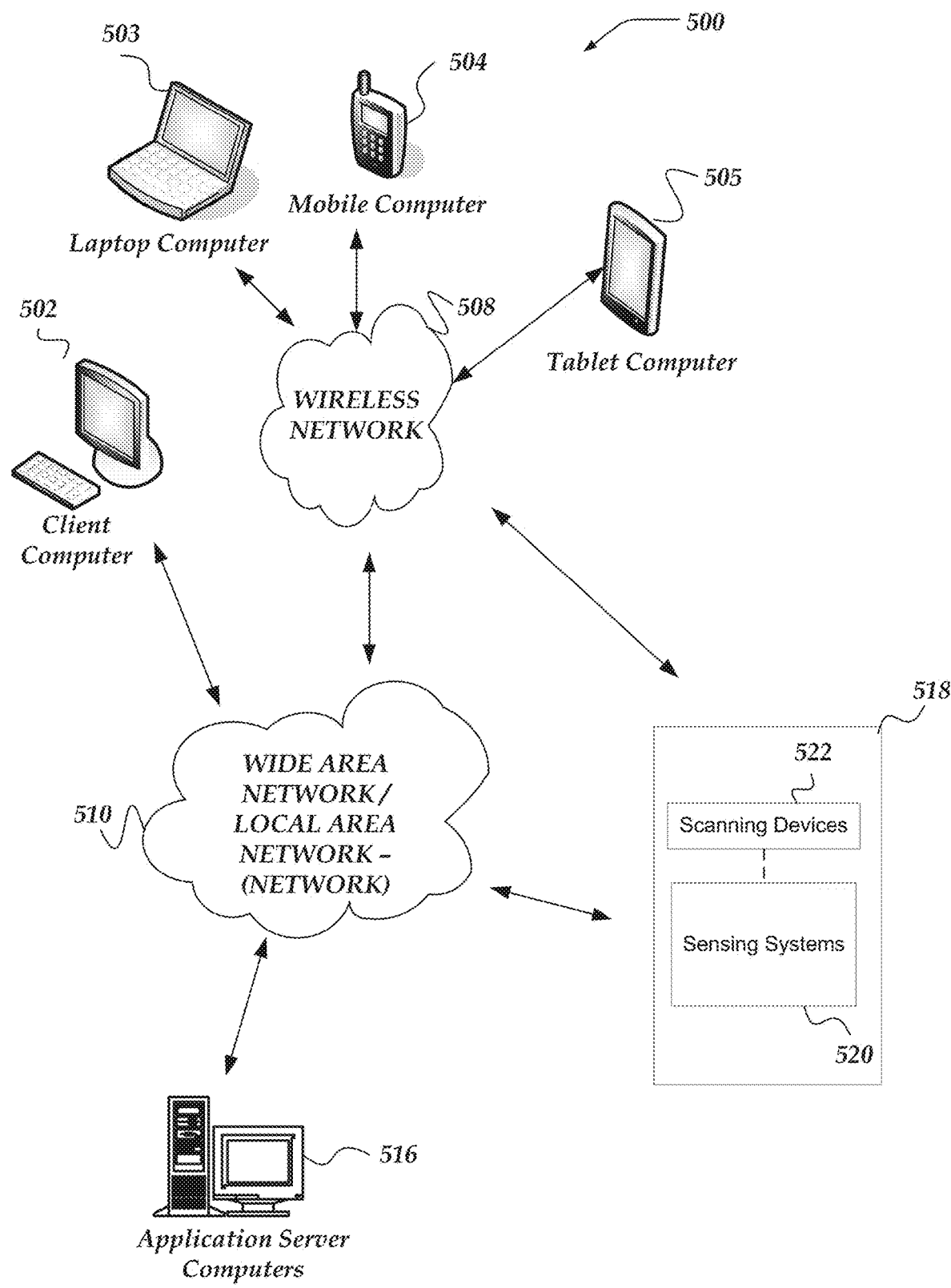
FIG. 5 shows components of one embodiment of an environment in which embodiments of the innovations may be practiced.

FIG. 5 shows components of one embodiment of an environment in which embodiments of the innovations may be practiced. Not all of the components may be required to practice the innovations, and variations in the arrangement and type of the components may be made without departing from the spirit or scope of the innovations. As shown, system 500 of FIG. 5 includes local area networks (LANs)/wide area networks (WANs), such as, network 510, wireless network 508, client computers 502-505, application server computer 516, scanning systems 518, or the like. In some embodiments, scanning systems 518 may include one or more of sensing systems 518, scanning devices 520, or the like.

At least one embodiment of client computers 502-505 is described in more detail below in conjunction with FIG. 8. In one or more embodiments, at least some of client computers 502-505 may operate over one or more wired or wireless networks, such as networks 508, or 510. Generally, client computers 502-505 may include virtually any computer capable of communicating over a network to send and receive information, perform various online activities, offline actions, or the like. In one embodiment, one or more of client computers 502-505 may be configured to operate within a business or other entity to perform a variety of services for the business or other entity. For example, client computers 502-505 may be configured to operate as a web server, firewall, client application, media player, mobile telephone, game console, desktop computer, or the like. However, client computers 502-505 are not constrained to these services and may also be employed, for example, as for end-user computing in other embodiments. It should be recognized that more or less client computers (as shown in FIG. 5) may be included within a system such as described herein, and embodiments are therefore not constrained by the number or type of client computers employed.

Computers that may operate as client computer 502 may include computers that typically connect using a wired or wireless communications medium such as personal computers, multiprocessor systems, microprocessor-based or programmable electronic devices, network PCs, or the like. In some embodiments, client computers 502-505 may include virtually any portable computer capable of connecting to another computer and receiving information such as, laptop computer 503, mobile computer 504, tablet computers 505, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 502-505 typically range widely in terms of capabilities and features. Moreover, client computers 502-505 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one or more embodiments, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one or more embodiments, a user of the client computer may employ the browser application to perform various activities over a network (online). However, another application may also be used to perform various online activities.

Client computers 502-505 also may include at least one other client application that is configured to receive or send content between another computer. The client application may include a capability to send or receive content, or the like. The client application may further provide information that identifies itself, including a type, capability, name, and the like. In one or more embodiments, client computers 502-505 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 516, scanning systems 518, sensing systems 520, scanning devices 522, or other computers.

Client computers 502-505 may further be configured to include a client application that enables an end-user to log into an end-user account that may be managed by another computer, such as application server computer 516, scanning systems 518, sensing systems 520, scanning devices 522, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 520 or scanning devices 522.

Wireless network 508 is configured to couple client computers 503-505 and its components with network 510. Wireless network 508 may include any of a variety of wireless sub-networks that may further overlay stand-alone ad-hoc networks, and the like, to provide an infrastructure-oriented connection for client computers 503-505. Such sub-networks may include mesh networks, Wireless LAN (WLAN) networks, cellular networks, and the like. In one or more embodiments, the system may include more than one wireless network.

Wireless network 508 may further include an autonomous system of terminals, gateways, routers, and the like connected by wireless radio links, and the like. These connectors may be configured to move freely and randomly and organize themselves arbitrarily, such that the topology of wireless network 508 may change rapidly.

Wireless network 508 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 503-505 with various degrees of mobility. In one non-limiting example, wireless network 508 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 508 may include virtually any wireless communication mechanism by which information may travel between client computers 503-505 and another computer, network, a cloud-based network, a cloud instance, or the like.

Network 510 is configured to couple network computers with other computers, including, application server computer 516, scanning systems 518, sensing systems 520, scanning devices 522, client computers 502, and client computers 503-505 through wireless network 508, or the like. Network 510 is enabled to employ any form of computer readable media for communicating information from one electronic device to another. Also, network 510 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices may be remotely connected to either LANs or WANs via a modem and temporary telephone link. In one or more embodiments, network 510 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 516, scanning systems 518 or scanning devices 520 are described in more detail below in conjunction with FIG. 6 or FIG. 7. Although FIG. 5 illustrates application server computer 516, sensing systems 520, and scanning devices 522 each as a single computer, the innovations or embodiments are not so limited. For example, one or more functions of application server computer 516, sensing systems 520, scanning devices 522, or the like, may be distributed across one or more distinct network computers, camera boxes, systems, or client computers. Moreover, in one or more embodiments, sensing systems 520 may be implemented using a plurality of network computers. Further, in one or more of the various embodiments, application server computer 516, sensing systems 520, or the like, may be implemented using one or more cloud instances in one or more cloud networks. Also, in some embodiments, application server computer 516, sensing systems 520, and scanning devices 522, or the like. Accordingly, these innovations and embodiments are not to be construed as being limited to a single environment, and other configurations, and other architectures are also envisaged.

Illustrative Client Computer

Figure 6:
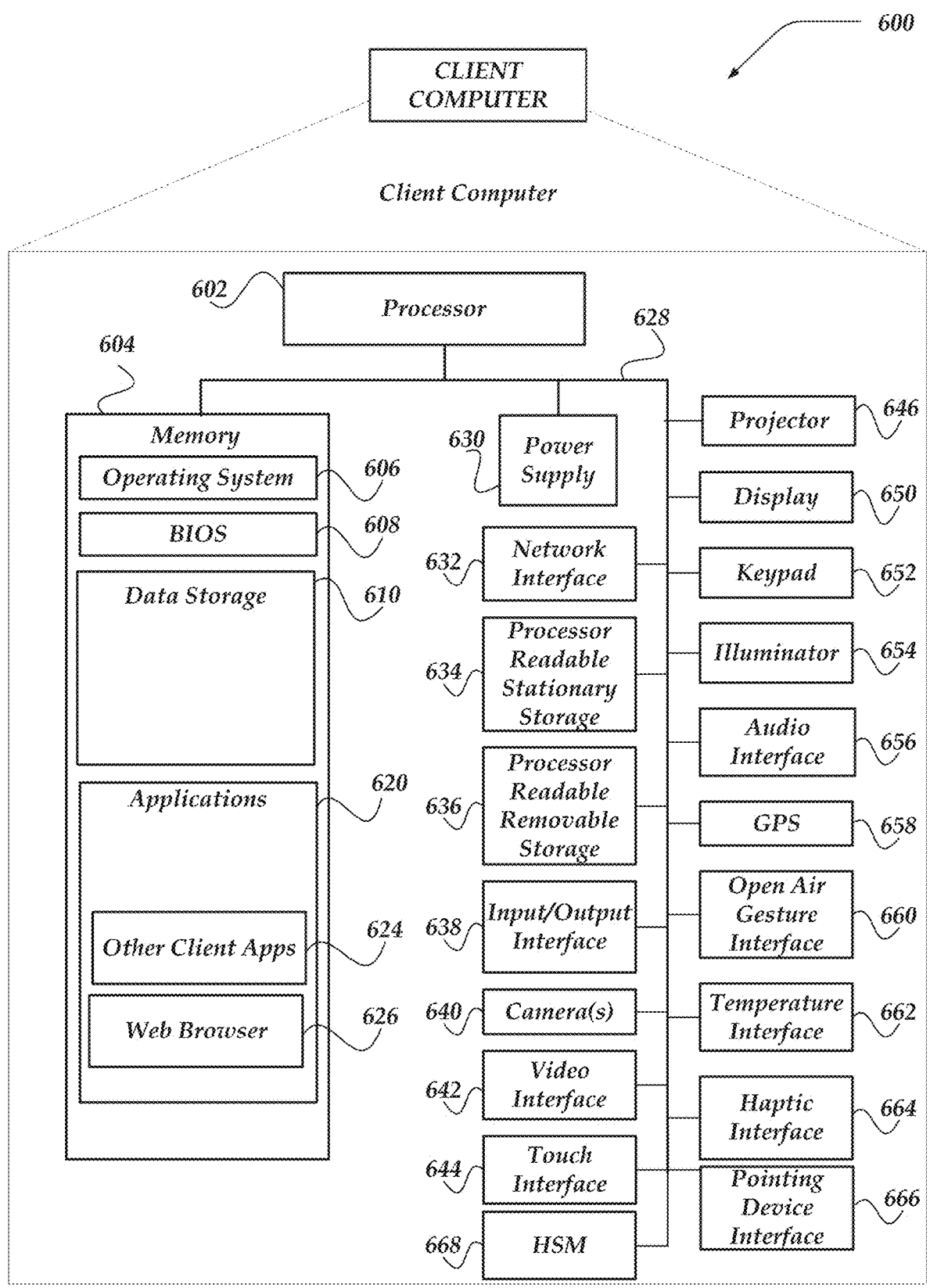
FIG. 6 shows one embodiment of a client computer that may include many more or less components than those shown.

FIG. 6 shows one embodiment of client computer 600 that may include many more or less components than those shown. Client computer 600 may represent, for example, one or more embodiments of mobile computers or client computers shown in FIG. 5. Further, scanning devices, mobile phones, scanning devices, or the like, discussed above may be considered client computers that may be arranged in configurations or form factors as described above. In some embodiments, some or all components of client computers, such as client computer 600 may be embedded or included in a vision system.

Client computer 600 may include processor 602 in communication with memory 604 via bus 628. Client computer 600 may also include power supply 630, network interface 632, audio interface 656, display 650, keypad 652, illuminator 654, video interface 642, input/output interface 638, haptic interface 664, global positioning systems (GPS) receiver 658, open air gesture interface 660, temperature interface 662, camera(s) 640, projector 646, pointing device interface 666, processor-readable stationary storage device 634, and processor-readable removable storage device 636. Client computer 600 may optionally communicate with a base station (not shown), or directly with another computer. And in one or more embodiments, although not shown, a gyroscope may be employed within client computer 600 to measuring or maintaining an orientation of client computer 600.

Power supply 630 may provide power to client computer 600. A rechargeable or non-rechargeable battery may be used to provide power. The power may also be provided by an external power source, such as an AC adapter or a powered docking cradle that supplements or recharges the battery.

Network interface 632 includes circuitry for coupling client computer 600 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 632 is sometimes known as a transceiver, transceiving device, or network interface card (NIC).

Audio interface 656 may be arranged to produce and receive audio signals such as the sound of a human voice. For example, audio interface 656 may be coupled to a speaker and microphone (not shown) to enable telecommunication with others or generate an audio acknowledgement for some action. A microphone in audio interface 656 can also be used for input to or control of client computer 600, e.g., using voice recognition, detecting touch based on sound, and the like.

Display 650 may be a liquid crystal display (LCD), gas plasma, electronic ink, light emitting diode (LED), Organic LED (OLED) or any other type of light reflective or light transmissive display that may be used with a computer. Display 650 may also include a touch interface 644 arranged to receive input from an object such as a stylus or a digit from a human hand, and may use resistive, capacitive, surface acoustic wave (SAW), infrared, radar, or other technologies to sense touch or gestures.

Projector 646 may be a remote handheld projector or an integrated projector that is capable of projecting an image on a remote wall or any other reflective object such as a remote screen.

Also, in some embodiments, if client computer 200 may be a scanning device, projector 646 may include one or more signal beam generators, laser scanner systems, or the like, that may be employed for scanning scene or objects as described above.

Video interface 642 may be arranged to capture video images, such as a still photo, a video segment, an infrared video, or the like. For example, video interface 642 may be coupled to a digital video camera, a web-camera, or the like. Video interface 642 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 652 may comprise any input device arranged to receive input from a user. For example, keypad 652 may include a push button numeric dial, or a keyboard. Keypad 652 may also include command buttons that are associated with selecting and sending images.

Illuminator 654 may provide a status indication or provide light. Illuminator 654 may remain active for specific periods of time or in response to event messages. For example, if illuminator 654 is active, it may backlight the buttons on keypad 652 and stay on while the client computer is powered. Also, illuminator 654 may backlight these buttons in various patterns if particular actions are performed, such as dialing another client computer. Illuminator 654 may also cause light sources positioned within a transparent or translucent case of the client computer to illuminate in response to actions.

Further, client computer 600 may also comprise hardware security module (HSM) 668 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 668 may be a stand-alone computer, in other cases, HSM 668 may be arranged as a hardware card that may be added to a client computer.

Client computer 600 may also comprise input/output interface 638 for communicating with external peripheral devices or other computers such as other client computers and network computers. The peripheral devices may include an audio headset, virtual reality headsets, display screen glasses, remote speaker system, remote speaker and microphone system, and the like. Input/output interface 638 can utilize one or more technologies, such as Universal Serial Bus (USB), Infrared, WiFi, WiMax, Bluetooth™, and the like.

Input/output interface 638 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or capture data that is external to client computer 600.

Haptic interface 664 may be arranged to provide tactile feedback to a user of the client computer. For example, the haptic interface 664 may be employed to vibrate client computer 600 in a particular way if another user of a computer is calling. Temperature interface 662 may be used to provide a temperature measurement input or a temperature changing output to a user of client computer 600. Open air gesture interface 660 may sense physical gestures of a user of client computer 600, for example, by using single or stereo video cameras, radar, a gyroscopic sensor inside a computer held or worn by the user, or the like. Camera 640 may be used to track physical eye movements of a user of client computer 600.

Further, in some cases, if client computer 600 may be a scanning device, camera 640 may represent one or more event cameras, one or more frame cameras, or the like.

GPS transceiver 658 can determine the physical coordinates of client computer 600 on the surface of the Earth, which typically outputs a location as latitude and longitude values. GPS transceiver 658 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 600 on the surface of the Earth. It is understood that under different conditions, GPS transceiver 658 can determine a physical location for client computer 600. In one or more embodiment, however, client computer 600 may, through other components, provide other information that may be employed to determine a physical location of the client computer, including for example, a Media Access Control (MAC) address, IP address, and the like.

In at least one of the various embodiments, applications, such as, operating system 606, other client apps 624, web browser 626, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 658. Also, in some embodiments, geolocation information may include information provided using one or more geolocation protocols over the networks, such as, wireless network 608 or network 611.

Human interface components may be peripheral devices that are physically separate from client computer 600, allowing for remote input or output to client computer 600. For example, information routed as described here through human interface components such as display 650 or keyboard 652 can instead be routed through network interface 632 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which may include a remote pico projector along with one or more cameras that remotely communicate with a separately located client computer to sense a user's gestures toward portions of an image projected by the pico projector onto a reflected surface such as a wall or the user's hand.

A client computer may include web browser application 626 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 604 may include RAM, ROM, or other types of memory. Memory 604 illustrates an example of computer-readable storage media (devices) for storage of information such as computer-readable instructions, data structures, program modules or other data. Memory 604 may store BIOS 608 for controlling low-level operation of client computer 600. The memory may also store operating system 606 for controlling the operation of client computer 600. It may be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 604 may further include one or more data storage 610, which can be utilized by client computer 600 to store, among other things, applications 620 or other data. For example, data storage 610 may also be employed to store information that describes various capabilities of client computer 600. The information may then be provided to another device or computer based on any of a variety of methods, including being sent as part of a header during a communication, sent upon request, or the like. Data storage 610 may also be employed to store social networking information including address books, buddy lists, aliases, user profile information, or the like. Data storage 610 may further include program code, data, algorithms, and the like, for use by a processor, such as processor 602 to execute and perform actions. In one embodiment, at least some of data storage 610 may also be stored on another component of client computer 600, including, but not limited to, non-transitory processor-readable removable storage device 636, processor-readable stationary storage device 634, or even external to the client computer.

Applications 620 may include computer executable instructions which, if executed by client computer 600, transmit, receive, or otherwise process instructions and data. Applications 620 may include, for example, other client applications 624, web browser 626, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 600 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 600 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 7:
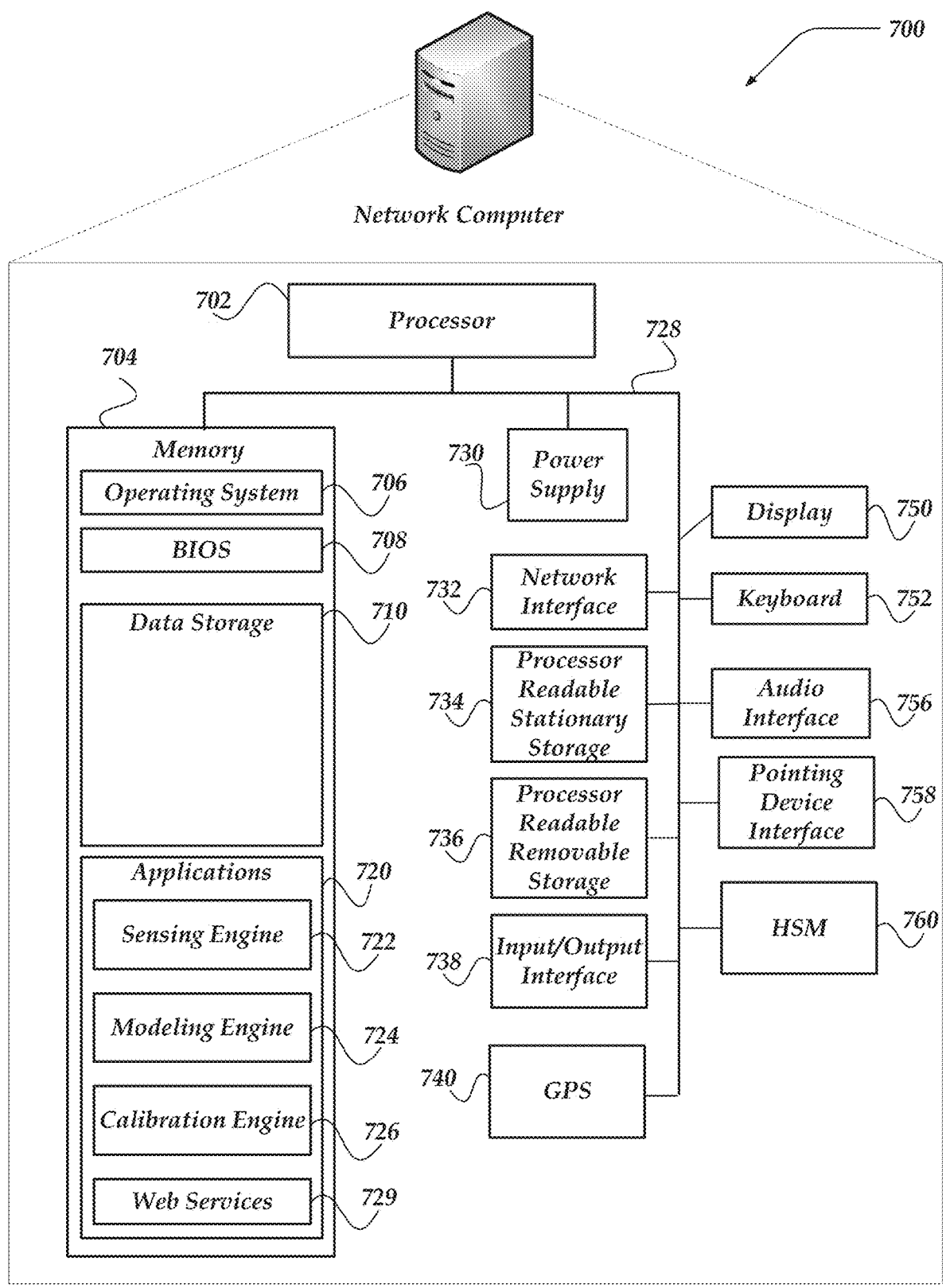
FIG. 7 shows one embodiment of a network computer that may be included in a system implementing one or more of the various embodiments.

FIG. 7 shows one embodiment of network computer 700 that may be included in a system implementing one or more of the various embodiments. Network computer 700 may include many more or less components than those shown in FIG. 7. However, the components shown are sufficient to disclose an illustrative embodiment for practicing these innovations. Network computer 700 may represent, for example, one embodiment of at least one of application server computer 616, or sensing systems 620 of FIG. 6. In some embodiments, network computers or portions thereof may be embedded or included in virtual fence systems.

In one or more of the various embodiments, scanning devices, sensing systems, mobile computers, or mobile phones may be arranged to communicate with one or more network computers, such as, network computer 700. In some embodiments, network computers may provide: software/firmware updates; backup storage; communication between or among scanning devices, mobile computers; or the like. In some cases, network computer 700 may be considered part of a cloud-based system that provides computational support for scanning devices, sensing systems, or the like.

Network computers, such as, network computer 700 may include a processor 702 that may be in communication with a memory 704 via a bus 728. In some embodiments, processor 702 may be comprised of one or more hardware processors, or one or more processor cores. In some cases, one or more of the one or more processors may be specialized processors designed to perform one or more specialized actions, such as, those described herein. Network computer 700 also includes a power supply 730, network interface 732, audio interface 756, display 750, keyboard 752, input/output interface 738, processor-readable stationary storage device 734, and processor-readable removable storage device 736. Power supply 730 provides power to network computer 700.

Network interface 732 includes circuitry for coupling network computer 700 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 732 is sometimes known as a transceiver, transceiving device, or network interface card (NIC). Network computer 700 may optionally communicate with a base station (not shown), or directly with another computer.

Audio interface 756 is arranged to produce and receive audio signals such as the sound of a human voice. For example, audio interface 756 may be coupled to a speaker and microphone (not shown) to enable telecommunication with others or generate an audio acknowledgement for some action. A microphone in audio interface 756 can also be used for input to or control of network computer 700, for example, using voice recognition.

Display 750 may be a liquid crystal display (LCD), gas plasma, electronic ink, light emitting diode (LED), Organic LED (OLED) or any other type of light reflective or light transmissive display that may be used with a computer. In some embodiments, display 750 may be a handheld projector or pico projector capable of projecting an image on a wall or other object.

Network computer 700 may also comprise input/output interface 738 for communicating with external devices or computers not shown in FIG. 7. Input/output interface 738 can utilize one or more wired or wireless communication technologies, such as, USB™, Firewire™, WiFi, WiMax, Thunderbolt™, Infrared, Bluetooth™, Zigbee™, serial port, parallel port, and the like.

Also, input/output interface 738 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or capture data that is external to network computer 700. Human interface components may be physically separate from network computer 700, allowing for remote input or output to network computer 700. For example, information routed as described here through human interface components such as display 750 or keyboard 752 can instead be routed through the network interface 732 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 758 to receive user input.

GPS transceiver 740 can determine the physical coordinates of network computer 700 on the surface of the Earth, which typically outputs a location as latitude and longitude values. GPS transceiver 740 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 700 on the surface of the Earth. It is understood that under different conditions, GPS transceiver 740 can determine a physical location for network computer 700. In one or more embodiments, however, network computer 700 may, through other components, provide other information that may be employed to determine a physical location of the client computer, including for example, a Media Access Control (MAC) address, IP address, and the like.

In at least one of the various embodiments, applications, such as, operating system 706, sensing engine 722, modeling engine 724, calibration engine 726, web services 729, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 740. Also, in some embodiments, geolocation information may include information provided using one or more geolocation protocols over the networks, such as, wireless network 508 or network 510.

Memory 704 may include Random Access Memory (RAM), Read-Only Memory (ROM), or other types of memory. Memory 704 illustrates an example of computer-readable storage media (devices) for storage of information such as computer-readable instructions, data structures, program modules or other data. Memory 704 stores a basic input/output system (BIOS) 708 for controlling low-level operation of network computer 700. The memory also stores an operating system 706 for controlling the operation of network computer 700. It may be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 704 may further include one or more data storage 710, which can be utilized by network computer 700 to store, among other things, applications 720 or other data. For example, data storage 710 may also be employed to store information that describes various capabilities of network computer 700. The information may then be provided to another device or computer based on any of a variety of methods, including being sent as part of a header during a communication, sent upon request, or the like. Data storage 710 may also be employed to store social networking information including address books, buddy lists, aliases, user profile information, or the like. Data storage 710 may further include program code, data, algorithms, and the like, for use by a processor, such as processor 702 to execute and perform actions such as those actions described below, in one or more embodiments, at least some of data storage 710 may also be stored on another component of network computer 700, including, but not limited to, non-transitory media inside processor-readable removable storage device 736, processor-readable stationary storage device 734, or any other computer-readable storage device within network computer 700, or even external to network computer 700.

Applications 720 may include computer executable instructions which, if executed by network computer 700, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 720 may include sensing engine 722, modeling engine 724, calibration engine 726, web services 729, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 722, modeling engine 724, calibration engine 726, web services 729, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 722, modeling engine 724, calibration engine 726, web services 729, or the like, may be provisioned and de-commissioned automatically.

Also, in one or more of the various embodiments, sensing engine 722, modeling engine 724, calibration engine 726, web services 729, or the like, may be located in virtual servers running in a cloud-based computing environment rather than being tied to one or more specific physical network computers.

Further, network computer 700 may also comprise hardware security module (HSM) 760 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 760 may be a stand-alone network computer, in other cases, HSM 760 may be arranged as a hardware card that may be installed in a network computer.

Additionally, in one or more embodiments (not shown in the figures), network computer 700 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Figure 8:
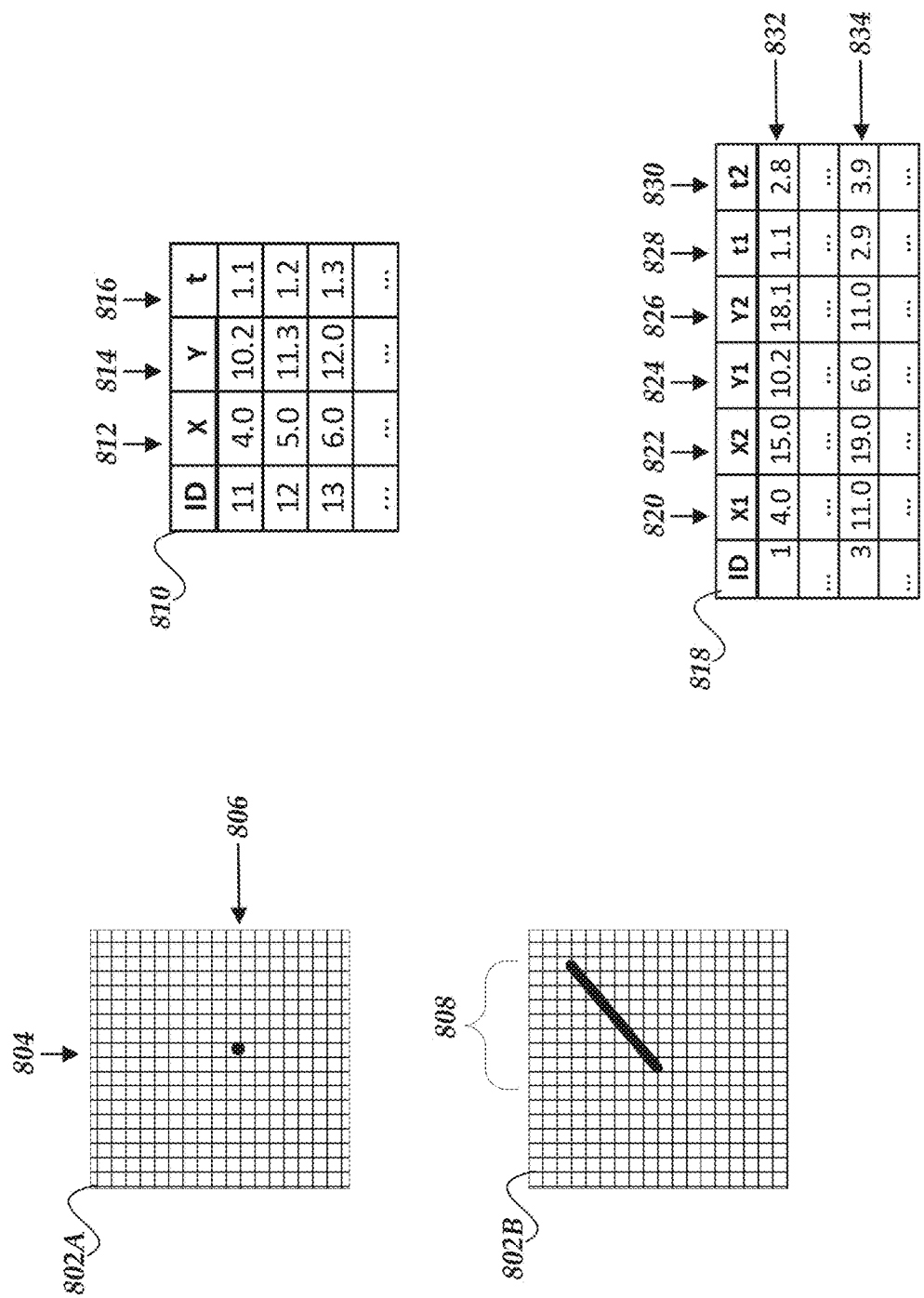
FIG. 8 illustrates a logical representation of sensors and sensor output information for perceiving scene features using event sensors and image sensors in accordance with one or more of the various embodiments.

FIG. 8 illustrates a logical representation of sensors and sensor output information for perceiving scene features using event sensors and image sensors in accordance with one or more of the various embodiments.

In one or more of the various embodiments, sensing systems, such as multi-camera system 100 (See, FIG. 1) may be provided sensor output from various sensors. In this example, for some embodiments, sensor 802A may be considered to represent a generic sensor that may emit signals that correspond to the precise location on the sensor where reflected energy from the scanning signal generator may be detected. For example, sensor 802A may be considered an array of detector cells that reports the cell location of the cell that has detected energy reflected from the scanning signal generator. In this example, horizontal location 804 and vertical location 806 may be considered to represent a location corresponding to the location in sensor 802 where reflected signal energy has been detected. Accordingly, sensor 802 may be considered a sensor that may be part of an event camera that may be included in a multi-camera sensing system, such as, system 100, or the like, where the signal energy may be provided scanning lasers and the reflect signal energy may be considered the laser light that may be reflected from one or more objects or surfaces in the scene.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employ triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a known precise path/curve (e.g., scanning path). Accordingly, in some embodiments, the pattern or sequence of cells in the sensors that detect reflected energy may follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 808 may represent a sequence of cells in sensor 802B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using various curves including Lissajous curves, 2D lines, or the like. In some cases, scanning path curves may be considered piece-wise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to if the detection event occurred.

In this example, for some embodiments, data structure 810 may be considered a data structure for representing sensor events based on sensor output provided to a sensing engine. In this example, column 812 represents the horizontal position of the location in the scanning environment, column 814 represents a vertical position in the scanning environment, and column 816 represents the time of the event. Accordingly, in some embodiments, sensing engines may be arranged to determine which (if any) sensor events should be associated with a trajectory. In some embodiments, sensing engines may be arranged to associate sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor events as noise if their location deviates from a predicted path beyond a defined threshold value.

In one or more of the various embodiments, sensing engines may be arranged to determine sensor events for each individual sensor rather than being limited to provide sensor events computed based on outputs from multiple sensors. For example, in some embodiments, sensing engines may be arranged to provide a data structure similar to data structure 810 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 818 to represent a trajectory that may be determined based on the information captured by the sensors. In this example, data structure 810 may be table-like structure that includes columns, such as, column 820 for storing a first x-position, column 822 for storing a second x-position, column 824 for storing a first y-position, column 826 for storing a second y-position, column 828 for storing the beginning time of a trajectory, column 830 for storing an end time of a trajectory, of the like.

In this example, row 832 represents information for a first trajectory and row 834 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements.

Further, one of ordinary skill in the art will appreciate that in some embodiments, trajectories may be projected/converted into 3-D scene coordinates based on calibration information, such as, the position or orientation of sensors, signal generators (e.g., scanning lasers), or the like.

In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may spread to adjacent cells, traverse adjacent cells, or land on the border of two or more adjacent cells. Accordingly, in some embodiments, to better estimate the real position of the reflected signal beam as it traverses the sensor plane, sensing engines may be arranged to perform an online smoothing estimate, e.g., using a Kalman filter to predict a position in a trajectory in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to if the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 818 for each sensor. Thus, the relative position information for different sensors or different collections of the data may be used to compute 3-D coordinates for events or trajectories.

Figure 9:
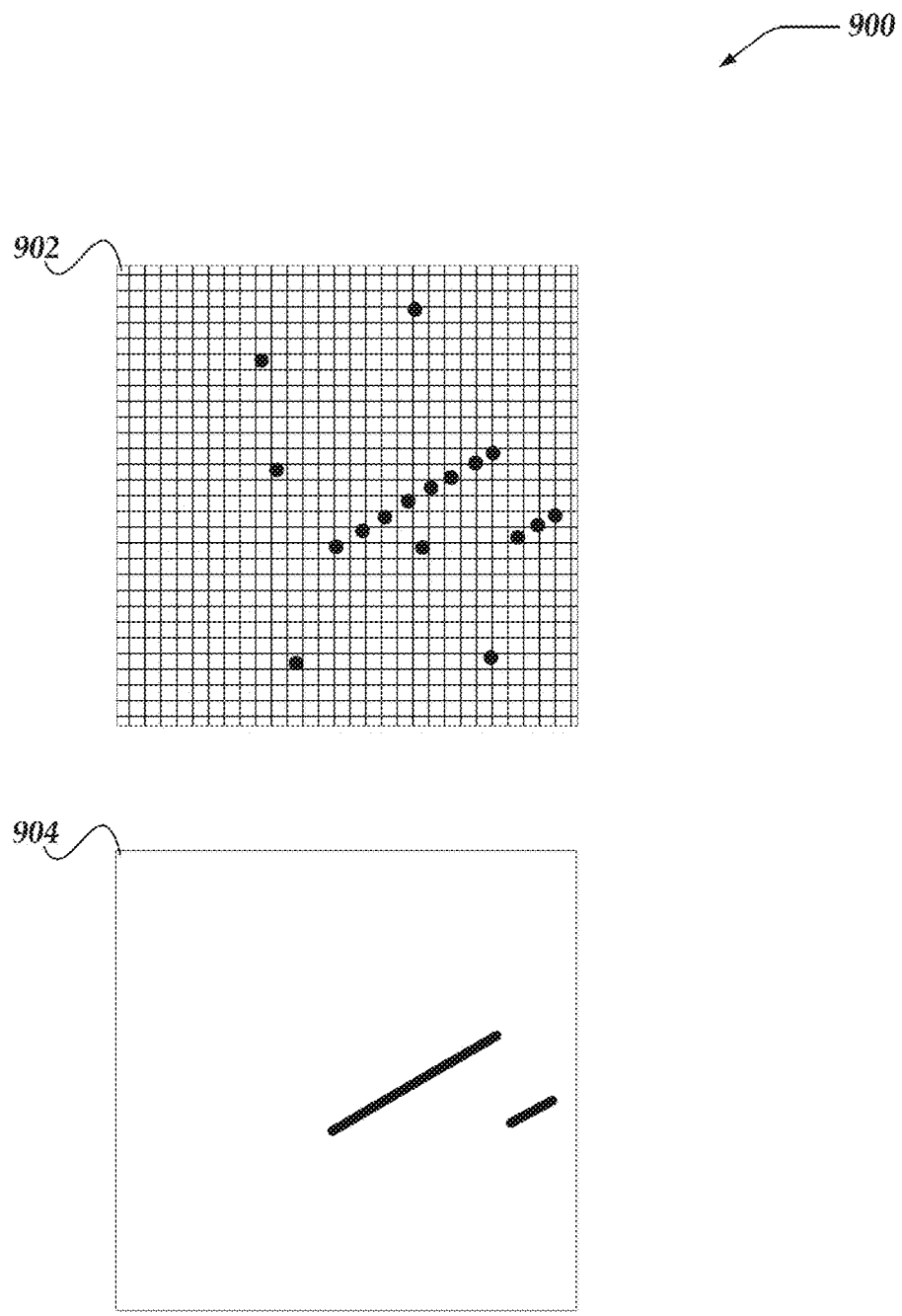
FIG. 9 illustrates a logical schematic of a system for perceiving scene features using event sensors and image sensors in accordance with one or more of the various embodiments.

FIG. 9 illustrates a logical schematic of system 900 for perceiving scene features using event sensors and image sensors in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 902 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 904.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines associated with sensing engines or scanning devices may be arranged to employ rules, instructions, heuristics, or the like, for classifying sensor events as noise that may be provided via configuration information to account for local requirements or local circumstances that may be associated with a sensing applications or sensors.

Figure 10:
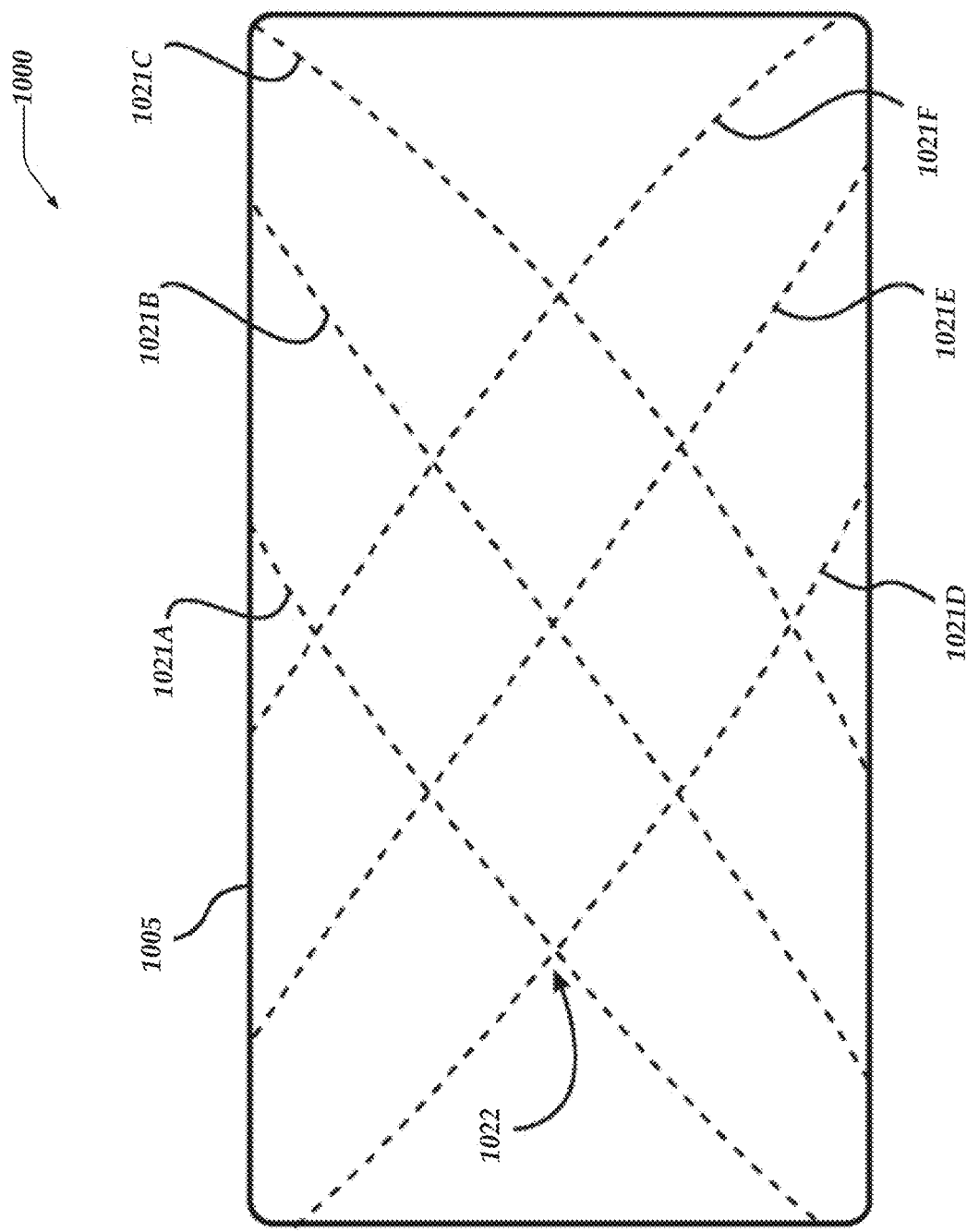
FIG. 10 illustrates how paths associated with scanned beams may traverse over or across a scene.

FIG. 10 illustrates how paths associated with scanned beams may traverse over or across a scene. In this example, scene 1005 represents a scanned surface or area displaying paths 1021A, 1021B, 1021C, 1021D, 1021E, and 1021F, which comprise a subset of the paths on the surface of scene 1005 in accordance with one or more of the various embodiments. A continuous portion of the path may be defined relative to parameters set on event sensors; although continuous paths may be defined in many ways, one way may be that neighboring or near events on a contiguous path as detected by an event sensor may be less than an arbitrary distance away from the preceding event on the path both spatially as well as in time, and generally may be produced by tracing a path on an object over a surface without significant discontinuities. In some embodiments, sensing systems may be arranged to employ rules, instructions, or the like, for determining trajectories or paths from events that may be provided via configuration information to account for local requirements or local circumstances.

In this example, crossing point 1022 may be representative of many crossing points that may occur during the scanning of an object or scene, and may be a point used as an artificial fiducial point. Though not all crossing points in FIG. 10 may be labeled as such, crossing points may be referred to by the paths which cross. For instance, point 1022 may also be named crossing point 1021AD, as this may be the crossing point of the paths 1021A and 1021D. Other crossing points may be referred to in a similar manner. For clarity, paths 1021A-F as shown may be representative of the path of a signal generator beam as it intersects the surface of an object or scene. Accordingly, events as captured on sensors may determine these paths, but may be detected as tilted or skewed differently, since the paths as seen on each sensor may be from the perspective of the sensor in its position.

Figure 11:
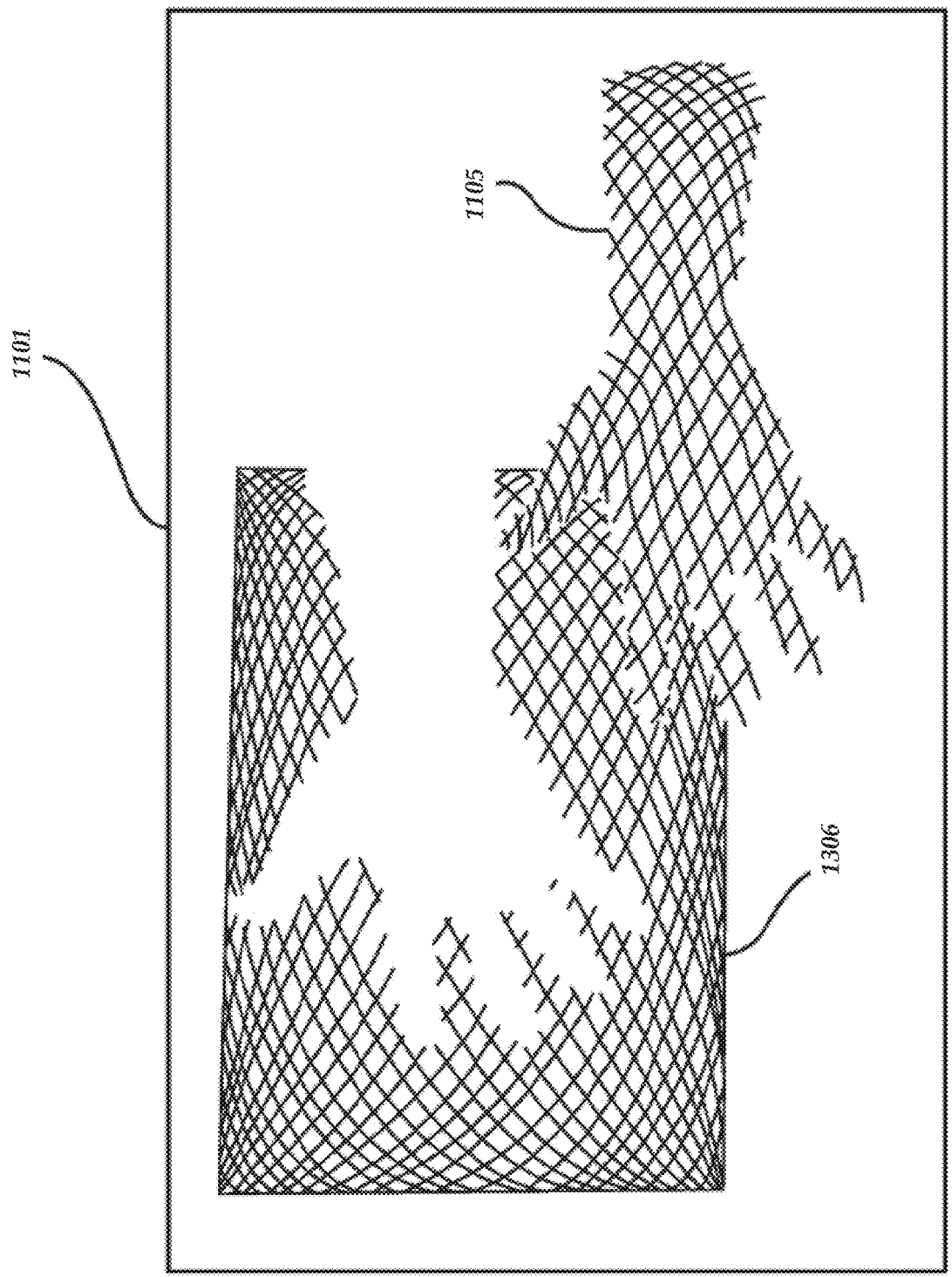
FIG. 11 illustrates a representation of how the shape or position of trajectories may correspond to the shapes or positions of subjects that may be scanned in scenes in accordance with one or more of the various embodiments.

FIG. 11 illustrates a representation of how the shape or position of trajectories may correspond to the shapes or positions of subjects that may be scanned in scenes in accordance with one or more of the various embodiments. It this example, scene 1101 may be scanned by beam generators, such as, laser beams from scanning systems, beam generators, signal generators, or otherwise. Accordingly, in some embodiments, a pattern of paths may be scanned across surface 1106. Also, in this example, shape 1105 may be distinguished from the background scene based on deformations or translations in the trajectories (e.g., paths) that result from the shape or position of the shape 1105 as compared to the background or other shapes that may be included in scene.

Also, it will be understood that each block (or step) in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as may arise in a multi-processor computer system. In addition, one or more blocks or combinations of blocks in each flowchart illustration may also be performed concurrently with other blocks or combinations of blocks, or even in a different sequence than illustrated without departing from the scope or spirit of the innovations.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators may be referred to above as lasers, scanning lasers, beams, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for sensing objects using one or more processors to execute instructions that are configured to cause actions, comprising:
    employing one or more enclosures mounted on one or more structures that are physically arranged to establish a boundary, wherein each enclosure includes one or more of an event camera, a beam generator, or a frame camera;
    employing the one or more beam generators to scan a plurality of paths across one or more objects in a scene that is observable outside the boundary;
    oscillating an angle of the one or more beam generators in a vertical plane based on a height of the mounting of the one or more enclosures, wherein a power level of the one or more beam generators is increased as the angle increases a distance of travel for the one or more beams to reach the one or more objects;
    determining a plurality of events based on detection of one or more beam reflections corresponding to the one or more objects;
    determining a plurality of trajectories associated with the one or more objects based on the plurality of paths and the plurality of events, wherein each trajectory is a parametric representation of a one-dimensional curve segment in a three-dimensional space;
    determining the one or more objects that are authorized based on a portion of the plurality of trajectories associated with the one or more authorized objects;
    determining the one or more objects in the scene that are unauthorized based on another portion of the plurality of trajectories associated with the one or more unauthorized objects; and
    generating a three-dimensional scene that includes a representation of the one or more unauthorized objects, wherein a position and an orientation of the one or more represented unauthorized objects in the scene are based on the plurality of trajectories.

2. The method of claim 1, wherein scanning the plurality of paths across one or more objects, further comprises:
    adjusting a power of the one or more beam generators based on a predicted distance to a portion of the one or more unauthorized objects, wherein increasing the power of the one or more beam generators enables the one or more beam generators to generate one or more trajectories for the portion of one or more the unauthorized objects that are at the predicted distance.

3. The method of claim 1, further comprising:
determining one or more persons in the scene based on the plurality of trajectories; and
adjusting a power level of the one or more beam generators based on a distance from the one or more beam generators to the one or more persons, wherein decreasing the power of the one or more beam generators reduces a probability of causing injury to the one or more persons.

4. The method of claim 1, further comprising:
adjusting a power level or a wavelength of the one or more beam generators based on a predicted distance from the one or more beam generators to a portion of the one or more unauthorized objects, wherein increasing the power of the one or more beam generators enables the one or more beam generators to generate one or more trajectories for a portion of one or more the unauthorized objects that are at the predicted distance.

5. The method of claim 1, further comprising:
oscillating an angle of the one or more beam generators in a vertical plane based on a height of the mounting of the one or more enclosures, wherein increasing the angle with respect to a horizon decreases a range of one or more beams from the one or more beam generators, and wherein decreasing the angle with respect to the horizon increases the range of the one or more beams.

6. The method of claim 1, wherein the one or more enclosures, further comprise:
one or more of another event camera:
another beam generator; or another frame camera;
wherein the other event camera, the other beam generator, or the other frame camera in the one or more enclosures are pointed towards a portion of the scene that is observable inside the boundary.

7. The method of claim 1, wherein the one or more enclosures, further comprise:
arranging the one or more structures along the boundary, wherein each enclosure is enabled to communicate to at least one other enclosure one or more of an event, a trajectory, object information, or scene information.

8. The method of claim 1, wherein the one or more enclosures, further comprise:
arranging the one or more structures in a mesh configuration, wherein each enclosure is enabled to communicate to at least one other enclosure one or more of an event, a trajectory, object information, or scene information.

9. The method of claim 1, wherein the one or more enclosures, further comprises:
positioning the one or more structures in an underwater environment;
determining a wavelength of the one or more beam generators based on a transmissibility of the one or more reflected beams through the underwater environment; and
adjusting a power level or a wavelength of the one or more beam generators based on a turbidity of the underwater environment, wherein the adjustment of the power or adjustment of the wavelength increases a distance of travel to the one or more objects for the one or more beams.

10. The method of claim 1, wherein the one or more enclosures, further comprise:
positioning the one or more structures in one or more satellites in an orbital environment above the earth; and
determining a portion of one or more objects that are moving towards the one or more structures based on one or more of an event or a trajectory.

11. A network computer for sensing objects, comprising:
a memory that stores at least instructions; and
one or more processors configured that execute instructions that are configured to cause actions, including
employing one or more enclosures mounted on one or more structures that are physically arranged to establish a boundary, wherein each enclosure includes one or more of an event camera, a beam generator, or a frame camera;
employing the one or more beam generators to scan a plurality of paths across one or more objects in a scene that is observable outside the boundary;
oscillating an angle of the one or more beam generators in a vertical plane based on a height of the mounting of the one or more enclosures, wherein a power level of the one or more beam generators is increased as the angle increases a distance of travel for the one or more beams to reach the one or more objects;
determining a plurality of events based on detection of one or more beam reflections corresponding to the one or more objects;
determining a plurality of trajectories associated with the one or more objects based on the plurality of paths and the plurality of events, wherein each trajectory is a parametric representation of a one-dimensional curve segment in a three-dimensional space;
determining the one or more objects that are authorized based on a portion of the plurality of trajectories associated with the one or more authorized objects;
determining the one or more objects in the scene that are unauthorized based on another portion of the plurality of trajectories associated with the one or more unauthorized objects; and
generating a three-dimensional scene that includes a representation of the one or more unauthorized objects, wherein a position and an orientation of the one or more represented unauthorized objects in the scene are based on the plurality of trajectories.

12. The network computer of claim 11, wherein scanning the plurality of paths across one or more objects, further comprises:
adjusting a power of the one or more beam generators based on a predicted distance to a portion of the one or more unauthorized objects, wherein increasing the power of the one or more beam generators enables the one or more beam generators to generate one or more trajectories for the portion of one or more the unauthorized objects that are at the predicted distance.

13. The network computer of claim 11, wherein the one or more processors execute instructions that are configured to cause actions, further comprising:
determining one or more persons in the scene based on the plurality of trajectories; and
adjusting a power level of the one or more beam generators based on a distance from the one or more beam generators to the one or more persons, wherein decreasing the power of the one or more beam generators reduces a probability of causing injury to the one or more persons.

14. The network computer of claim 11, wherein the one or more processors execute instructions that are configured to cause actions, further comprising:

adjusting a power level or a wavelength of the one or more beam generators based on a predicted distance from the one or more beam generators to a portion of the one or more unauthorized objects, wherein increasing the power of the one or more beam generators enables the one or more beam generators to generate one or more trajectories for a portion of one or more the unauthorized objects that are at the predicted distance.

15. The network computer of claim 11, wherein the one or more processors execute instructions that are configured to cause actions, further comprising:
oscillating an angle of the one or more beam generators in a vertical plane based on a height of the mounting of the one or more enclosures, wherein increasing the angle with respect to a horizon decreases a range of one or more beams from the one or more beam generators, and wherein decreasing the angle with respect to the horizon increases the range of the one or more beams.

16. The network computer of claim 11, wherein the one or more enclosures, further comprise:
one or more of another event camera:
another beam generator; or another frame camera;
wherein the other event camera, the other beam generator, or the other frame camera in the one or more enclosures are pointed towards a portion of the scene that is observable inside the boundary.

17. The network computer of claim 11, wherein the one or more enclosures, further comprise:
arranging the one or more structures along the boundary, wherein each enclosure is enabled to communicate to at least one other enclosure one or more of an event, a trajectory, object information, or scene information.

18. The network computer of claim 11, wherein the one or more enclosures, further comprise:
arranging the one or more structures in a mesh configuration, wherein each enclosure is enabled to communicate to at least one other enclosure one or more of an event, a trajectory, object information, or scene information.

19. The network computer of claim 11, wherein the one or more enclosures, further comprises:
positioning the one or more structures in an underwater environment;
determining a wavelength of the one or more beam generators based on a transmissibility of the one or more reflected beams through the underwater environment; and
adjusting a power level or a wavelength of the one or more beam generators based on a turbidity of the underwater environment, wherein the adjustment of the power or adjustment of the wavelength increases a distance of travel to the one or more objects for the one or more beams.

20. The network computer of claim 11, wherein the one or more enclosures, further comprise:
positioning the one or more structures in one or more satellites in an orbital environment above the earth; and
determining a portion of one or more objects that are moving towards the one or more structures based on one or more of an event or a trajectory.

21. A processor readable non-transitory storage media that includes instructions for sensing objects, wherein execution of the instructions by one or more processors on one or more network computers performs actions, comprising:
employing one or more enclosures mounted on one or more structures that are physically arranged to establish a boundary, wherein each enclosure includes one or more of an event camera, a beam generator, or a frame camera;
employing the one or more beam generators to scan a plurality of paths across one or more objects in a scene that is observable outside the boundary;
oscillating an angle of the one or more beam generators in a vertical plane based on a height of the mounting of the one or more enclosures, wherein a power level of the one or more beam generators is increased as the angle increases a distance of travel for the one or more beams to reach the one or more objects;
determining a plurality of events based on detection of one or more beam reflections corresponding to the one or more objects;
determining a plurality of trajectories associated with the one or more objects based on the plurality of paths and the plurality of events, wherein each trajectory is a parametric representation of a one-dimensional curve segment in a three-dimensional space;
determining the one or more objects that are authorized based on a portion of the plurality of trajectories associated with the one or more authorized objects;
determining the one or more objects in the scene that are unauthorized based on another portion of the plurality of trajectories associated with the one or more unauthorized objects; and
generating a three-dimensional scene that includes a representation of the one or more unauthorized objects, wherein a position and an orientation of the one or more represented unauthorized objects in the scene are based on the plurality of trajectories.

22. The media of claim 21, wherein scanning the plurality of paths across one or more objects, further comprises:
adjusting a power of the one or more beam generators based on a predicted distance to a portion of the one or more unauthorized objects, wherein increasing the power of the one or more beam generators enables the one or more beam generators to generate one or more trajectories for the portion of one or more the unauthorized objects that are at the predicted distance.

23. The media of claim 21, further comprising:
determining one or more persons in the scene based on the plurality of trajectories; and
adjusting a power level of the one or more beam generators based on a distance from the one or more beam generators to the one or more persons, wherein decreasing the power of the one or more beam generators reduces a probability of causing injury to the one or more persons.

24. The media of claim 21, further comprising:
adjusting a power level or a wavelength of the one or more beam generators based on a predicted distance from the one or more beam generators to a portion of the one or more unauthorized objects, wherein increasing the power of the one or more beam generators enables the one or more beam generators to generate one or more trajectories for a portion of one or more the unauthorized objects that are at the predicted distance.

25. The media of claim 21, further comprising:
oscillating an angle of the one or more beam generators in a vertical plane based on a height of the mounting of the one or more enclosures, wherein increasing the angle with respect to a horizon decreases a range of one or more beams from the one or more beam generators, and wherein decreasing the angle with respect to the horizon increases the range of the one or more beams.

26. The media of claim 21, wherein the one or more enclosures, further comprise:
one or more of another event camera:
another beam generator; or another frame camera;
wherein the other event camera, the other beam generator, or the other frame camera in the one or more enclosures are pointed towards a portion of the scene that is observable inside the boundary.

27. The media of claim 21, wherein the one or more enclosures, further comprise:
arranging the one or more structures along the boundary, wherein each enclosure is enabled to communicate to at least one other enclosure one or more of an event, a trajectory, object information, or scene information.

28. The media of claim 21, wherein the one or more enclosures, further comprise:
arranging the one or more structures in a mesh configuration, wherein each enclosure is enabled to communicate to at least one other enclosure one or more of an event, a trajectory, object information, or scene information.

29. The media of claim 21, wherein the one or more enclosures, further comprises:
positioning the one or more structures in an underwater environment;
determining a wavelength of the one or more beam generators based on a transmissibility of the one or more reflected beams through the underwater environment; and
adjusting a power level or a wavelength of the one or more beam generators based on a turbidity of the underwater environment, wherein the adjustment of the power or adjustment of the wavelength increases a distance of travel to the one or more objects for the one or more beams.

30. The media of claim 21, wherein the one or more enclosures, further comprise:
positioning the one or more structures in one or more satellites in an orbital environment above the earth; and
determining a portion of one or more objects that are moving towards the one or more structures based on one or more of an event or a trajectory.

* * * * *

UNITED STATES PATENT AND TRADEMARK OFFICE
CERTIFICATE OF CORRECTION

PATENT NO. : 12,276,730 B2
APPLICATION NO. : 18/504052
DATED : April 15, 2025
INVENTOR(S) : Smits et al.

Page 1 of 1

It is certified that error appears in the above-identified patent and that said Letters Patent is hereby corrected as shown below:

In the Claims

In Column 39, Line 41, in Claim 7, delete "enclosure" and insert -- enclosure, --, therefor.

In Column 39, Line 47, in Claim 8, delete "enclosure" and insert -- enclosure, --, therefor.

In Column 40, Line 7, in Claim 11, delete "including" and insert -- including, --, therefor.

In Column 41, Line 32, in Claim 17, delete "enclosure" and insert -- enclosure, --, therefor.

In Column 41, Line 38, in Claim 18, delete "enclosure" and insert -- enclosure, --, therefor.

In Column 43, Line 13, in Claim 27, delete "enclosure" and insert -- enclosure, --, therefor.

In Column 43, Line 20, in Claim 28, delete "enclosure" and insert -- enclosure, --, therefor.

Signed and Sealed this
First Day of July, 2025

Coke Morgan Stewart
*Acting Director of the United States Patent and Trademark Office*